United States Patent
Kavirayani et al.

(10) Patent No.: US 12,229,403 B2
(45) Date of Patent: Feb. 18, 2025

(54) HYBRID LOGICAL TO PHYSICAL MAPPING FOR ZNS BASED SSDS

(71) Applicant: Western Digital Technologies, Inc., San Jose, CA (US)

(72) Inventors: Chaitanya Kavirayani, Karnataka (IN); Vineet Agarwal, Karnataka (IN); Sampath Raja Murthy, Karnataka (IN); Aakar Deora, Karnataka (IN); Varun Singh, Delhi (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 60 days.

(21) Appl. No.: 17/933,720

(22) Filed: Sep. 20, 2022

(65) Prior Publication Data
US 2024/0094903 A1 Mar. 21, 2024

(51) Int. Cl.
*G06F 3/06* (2006.01)
*G06F 12/02* (2006.01)

(52) U.S. Cl.
CPC .......... *G06F 3/0604* (2013.01); *G06F 3/0656* (2013.01); *G06F 3/0659* (2013.01); *G06F 3/0679* (2013.01); *G06F 12/0246* (2013.01); *G06F 2212/7201* (2013.01)

(58) Field of Classification Search
CPC .... G06F 3/0604; G06F 3/0656; G06F 3/0659; G06F 3/0679; G06F 12/0246; G06F 2212/7201
See application file for complete search history.

(56) References Cited

U.S. PATENT DOCUMENTS

| 8,819,367 | B1 * | 8/2014 | Fallone | G06F 11/1456 |
| | | | | 711/162 |
| 10,802,739 | B1 * | 10/2020 | Weber | G06F 3/061 |
| 10,990,526 | B1 | 4/2021 | Lam et al. | |

(Continued)

OTHER PUBLICATIONS

Lee, Youngjae, Jeeyoon Jung, and Dongkun Shin. "Buffered i/o support for zoned namespace ssd." 2021 IEEE International Conference on Consumer Electronics-Asia (ICCE-Asia). IEEE, 2021. (Year: 2021).*

(Continued)

*Primary Examiner* — Nicholas J Simonetti
(74) *Attorney, Agent, or Firm* — ARENTFOX SCHIFF LLP

(57) ABSTRACT

Aspects of a storage device are provided that handle host commands associated with active and inactive zones using a hybrid L2P mapping system. The storage device includes a NVM, a controller, a first volatile memory and a second volatile memory. The controller allocates, as a superblock, one or more physical blocks respectively in one or more memory dies of the NVM, receives write commands including logical addresses associated with active zones, and stores in an L2P mapping table L2P address mappings of these logical addresses to physical addresses associated with either volatile memory or the superblock. The controller refrains from storing L2P address mappings for inactive zones, instead storing in a superblock mapping table a mapping of superblocks to inactive zones in response to respective zone finish commands. As a result, L2P mapping table sizes are reduced, zone read, reset, and TTR performance are increased, and reduced WAF is achieved.

20 Claims, 17 Drawing Sheets

(56) References Cited

U.S. PATENT DOCUMENTS

| | | | |
|---|---|---|---|
| 11,200,162 B2 | 12/2021 | Helmick et al. | |
| 11,269,778 B1* | 3/2022 | Kanteti | G06F 12/0873 |
| 11,586,385 B1* | 2/2023 | Lercari | G06F 12/0246 |
| 2016/0313921 A1* | 10/2016 | Kojima | G06F 12/0246 |
| 2016/0371195 A1* | 12/2016 | Kim | G06F 3/061 |
| 2021/0055864 A1 | 2/2021 | Noh et al. | |
| 2021/0255803 A1* | 8/2021 | Kanno | G06F 3/061 |
| 2021/0318820 A1 | 10/2021 | Jin et al. | |
| 2021/0342267 A1* | 11/2021 | Lam | G06F 12/1009 |
| 2022/0100419 A1 | 3/2022 | Jang | |
| 2022/0350530 A1* | 11/2022 | Yoshida | G06F 3/0644 |
| 2023/0152973 A1* | 5/2023 | Hwang | G06F 3/0608 |
| | | | 711/103 |

OTHER PUBLICATIONS

Han, Kyuhwa, et al. "ZNS+: Advanced zoned namespace interface for supporting in-storage zone compaction." 15th {USENIX} Symposium on Operating Systems Design and Implementation ({OSDI} 21). 2021. (Year: 2021).*

Bae, Hanyeoreum, et al. "What you can't forget: exploiting parallelism for zoned namespaces." Proceedings of the 14th ACM Workshop on Hot Topics in Storage and File Systems. Jun. 2022. (Year: 2022).*

* cited by examiner

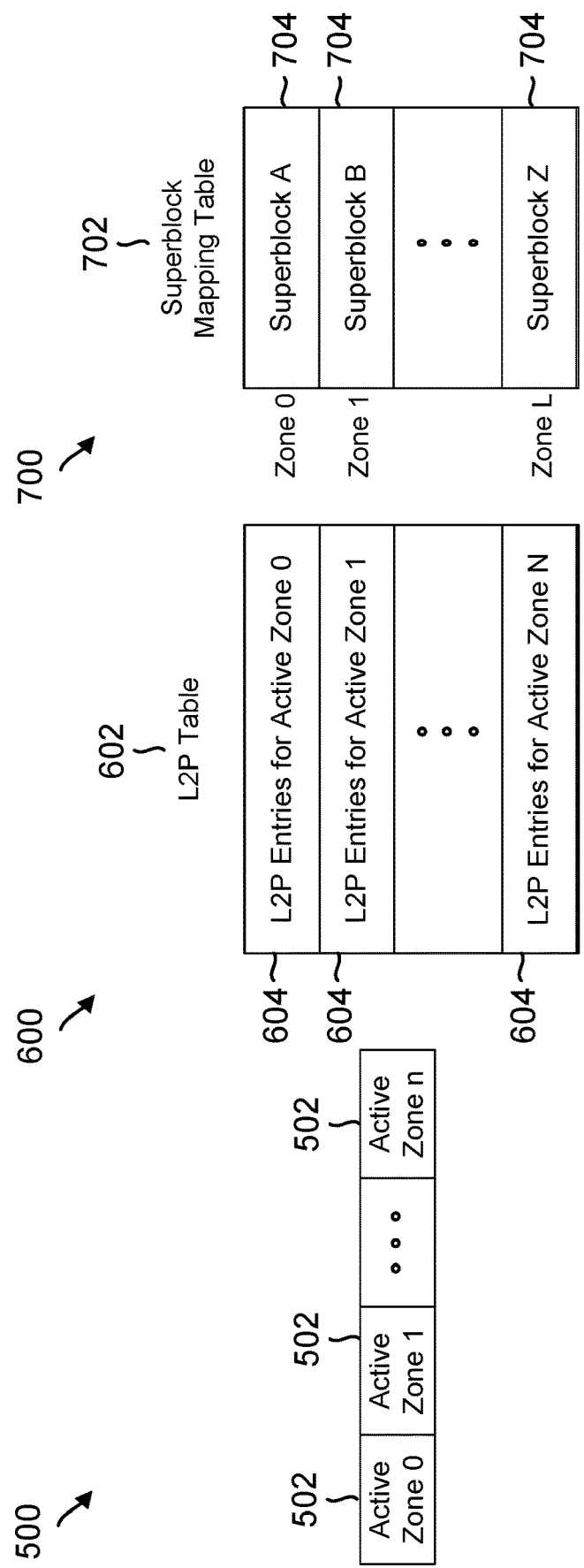

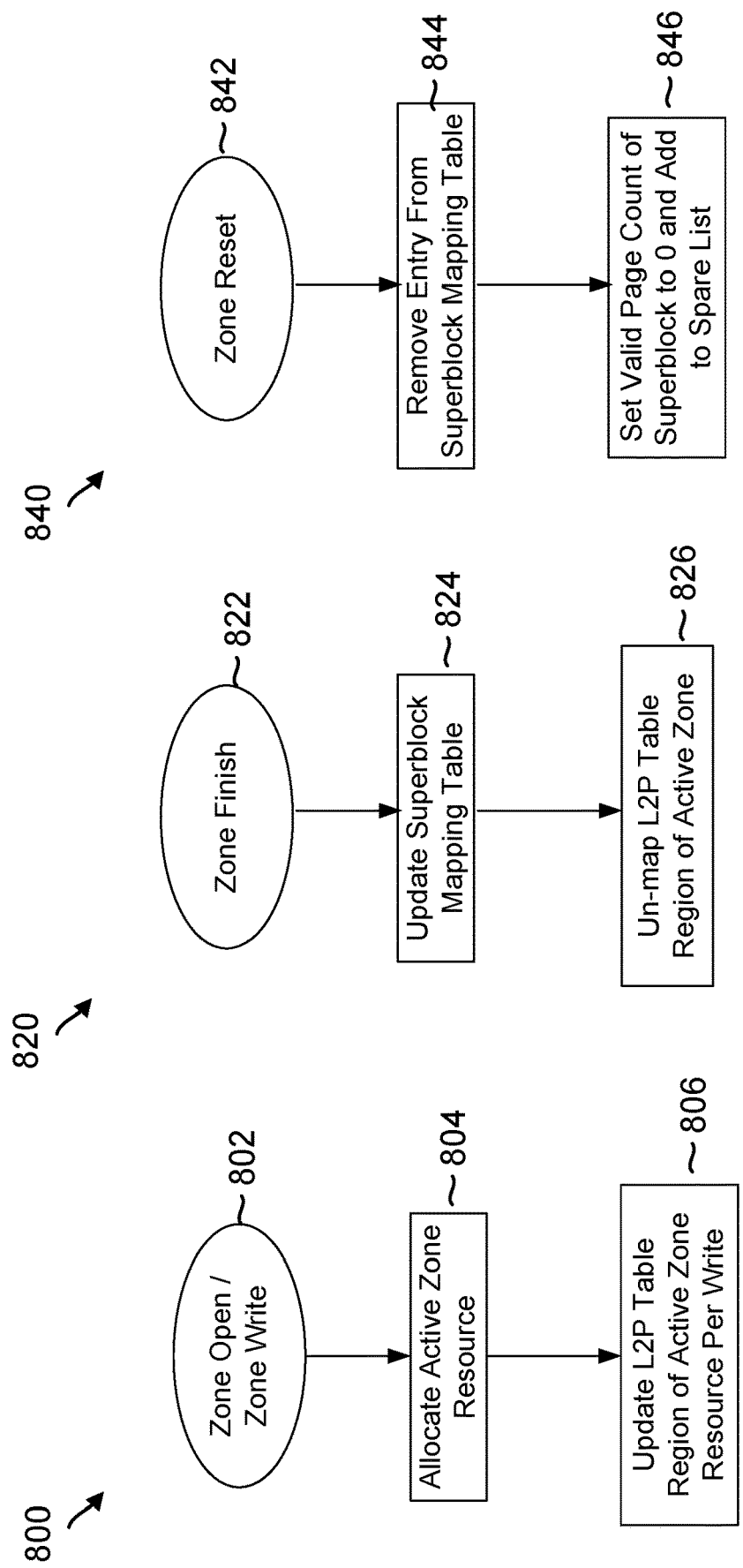

HYBRID LOGICAL TO PHYSICAL MAPPING FOR ZNS BASED SSDS

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

Zoned Namespace (ZNS) is an SSD namespace architecture in which a range of logical addresses in the non-volatile memory (e.g. a zoned namespace) is divided into fixed-sized groups of logical addresses, or zones. Each zone within the zoned namespace may be used for a specific application. For example, the host may write data associated with different applications in different zones of the zoned namespace.

SUMMARY

One aspect of a storage device is disclosed herein. The storage device includes a non-volatile memory, a first volatile memory, a second volatile memory, and a controller. The controller is configured to receive a write command including a logical address associated with a zone, the zone including a range of logical addresses. The controller is further configured to store, in a logical-to-physical (L2P) mapping table in the first volatile memory or the second volatile memory, a L2P address mapping of the logical address associated with the zone to a physical address associated with the first volatile memory or the non-volatile memory, the L2P address mapping being stored in response to the zone being an active zone. The controller is also configured to refrain from storing L2P address mappings for inactive zones in the L2P mapping table.

Another aspect of a storage device is disclosed herein. The storage device includes a plurality of non-volatile memory dies, a first volatile memory, a second volatile memory, and a controller. Each of the non-volatile memory dies includes a physical block. The controller is configured to allocate, as a superblock, one or more of the physical blocks; and store in a superblock mapping table in the first volatile memory or the second volatile memory, a mapping of the superblock to a zone including a range of logical addresses.

A further aspect of a storage device is disclosed herein. The storage device includes a plurality of non-volatile memory dies, a first volatile memory, a second volatile memory, and a controller. Each of the non-volatile memory dies includes a physical block. The controller is configured to allocate, as a superblock, one or more of the physical blocks. The controller is further configured to receive a write command including a logical address associated with a zone, the zone including a range of logical addresses; and store, in a L2P mapping table in the first volatile memory or the second volatile memory, a L2P address mapping of the logical address associated with the zone to a physical address associated with the first volatile memory or the superblock, the L2P address mapping being stored in response to the zone being an active zone. The controller is also configured to refrain from storing L2P address mappings for inactive zones in the L2P mapping table. Moreover, the controller is configured to store in a superblock mapping table in the first volatile memory or the second volatile memory, a mapping of the superblock to the zone in response to a zone finish command indicating to deactivate the active zone into an inactive zone; and remove the L2P address mapping from the L2P mapping table further in response to the zone finish command.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIG. 5 is a conceptual diagram illustrating an example of a list of active zones in the storage device of FIG. 1.

FIG. 6 is a conceptual diagram illustrating an example of an L2P mapping table including L2P entries for active zones in the storage device of FIG. 1.

FIG. 7 is a conceptual diagram illustrating an example of a superblock mapping table in the storage device of FIG. 1.

FIGS. 8A-8C are flow charts respectively illustrating examples of methods for handling different zone management operation commands performed by the storage device of FIG. 1.

DETAILED DESCRIPTION

Figure 1:
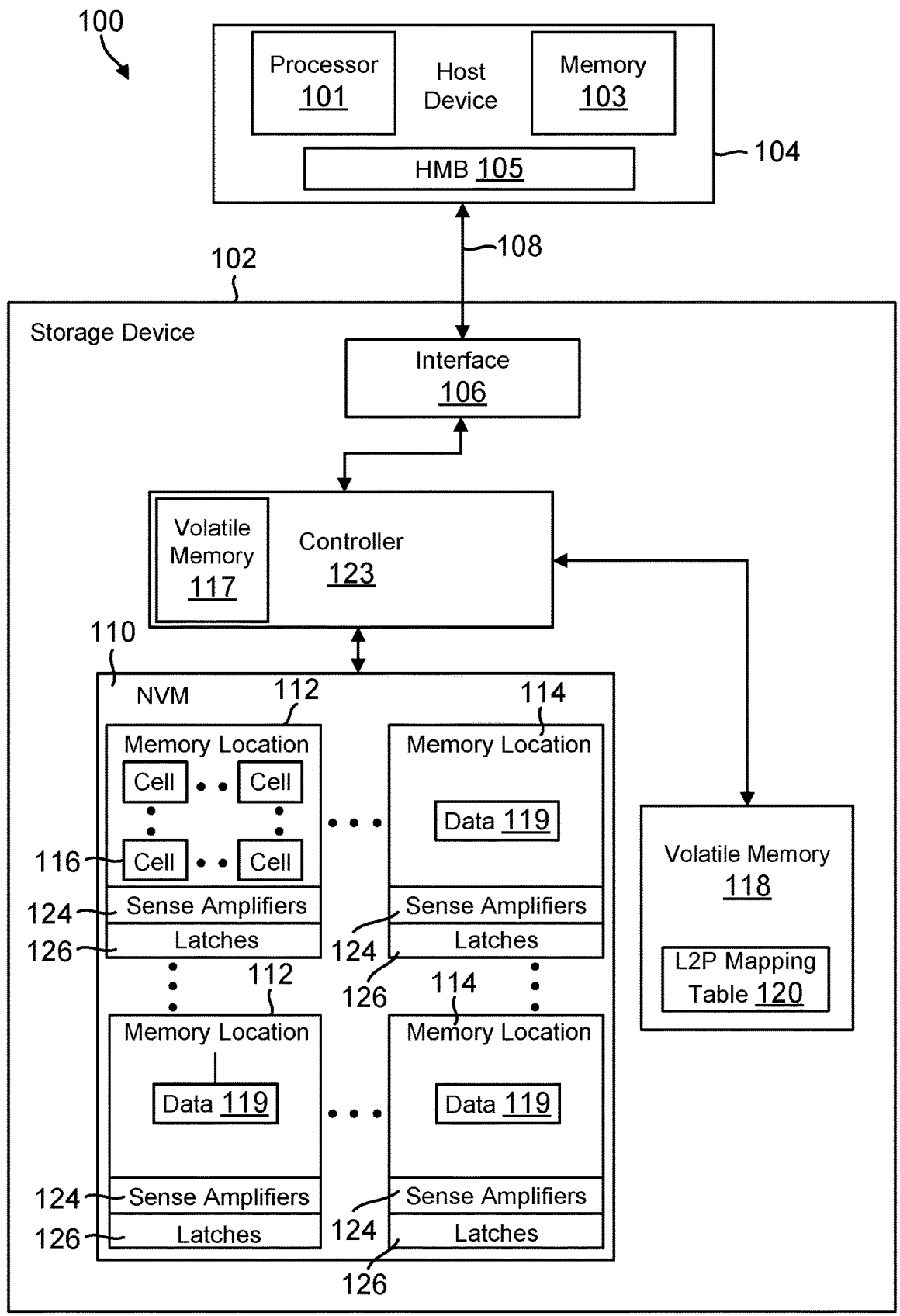
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

In zoned namespace (ZNS) architectures, a flash storage device may determine a definition of zones, or groups of logical addresses, for data storage. For example, the flash storage device may determine that one group of logical pages, or one logical block, is associated with a first zone, that another group of logical pages, or another logical block, is associated with a second zone, and so forth. The flash storage device may then map each logical block to one or more physical blocks in the flash memory. For instance, the flash storage device may map the logical pages associated with the first zone to physical pages in a first group of physical blocks, the logical pages associated with the second zone to physical pages in a second group of physical blocks, etc. The flash storage device may maintain these mappings of logical pages to physical pages in flash memory in a logical-to-physical (L2P) mapping table in volatile memory (e.g., dynamic random access memory (DRAM) or static random access memory (SRAM)).

Initially, to write data to a zone, the host may send a zone open command or a zone write command to the flash storage device, which command(s) may activate the zone and include host data to be written to the zone and a logical address associated with the zone. In response to the zone open/write command, the flash storage device may add the zone to a list of active zones, allocate a superblock to this active zone, and the flash storage device may write the data to the zone at the indicated logical address. In this disclosure, a superblock may refer to a physical block (e.g., a single erase block), a group of physical blocks in a single memory die, a group of physical blocks across multiple memory dies, or some other grouping of one or more physical blocks. The flash storage device may also create an L2P entry associated with that zone write command in the L2P mapping table. Afterwards, the host may continue to send zone write commands to write additional host data at subsequent logical addresses associated with the active zone. In response to these respective zone write commands, the flash storage device may create additional L2P entries respectively in the L2P mapping table and store the additional host data in the superblock associated with that active zone. The host may also issue zone read commands for data respectively in indicated logical addresses at the associated zone, in response to which commands the flash storage device may identify the physical addresses of the associated block(s) from the L2P mapping table and read the data from those physical addresses accordingly.

Once the zone is full (e.g., no further host data can be written to that active zone), or if the host does not intend to write data further to that zone (e.g., even if the zone is only partially full), the host may send a zone finish command to the flash storage device indicating to close the active zone or otherwise change its status to an inactive zone. In response to the zone finish command, the flash storage device may remove the zone from the list of active zones and may not accept any more zone write commands to that zone. However, since the host may still issue zone read commands to read data from that zone, the flash storage device continues to maintain the L2P mapping table with the previous L2P mapping entries for each logical address in that newly inactive zone. Later on, if the host determines to re-use the zone (e.g., for a different application), the host may issue a zone reset command to the flash storage device indicating to reset the zone. In response to the zone reset command, the flash storage device may remove the L2P mapping entries associated with that zone, and may afterwards write new host data to that zone with associated L2P mapping entries in response to a subsequent zone open/zone write commands.

In ZNS, host data is strictly written sequentially to a zone. For example, whenever the host issues a zone write command in which it sends the flash storage device a logical page of data to be written to flash memory at a given logical address, the flash storage device moves a write pointer to the next logical address in the zone, and the host is expected to send data for that next logical page when issuing a subsequent zone write command. If the host does not follow this sequence (e.g., if the next write command from the host includes a logical address which is out of order in the sequence, such as a same logical address in an attempted data overwrite), the flash storage device may issue an error and abort the zone write. As a result, a host generally may not overwrite data at a given logical address in a zone until after the zone is fully written.

However, ZNS may be extended to support data overwrites in a zone within a zone random write area (ZRWA) associated with that zone. For instance, the host may send a zone open command to open a zone in a ZRWA mode, and this mode may remain associated with the zone until the zone is finished. For a zone opened in a ZRWA mode, the flash storage device may define a predefined region size (e.g., 1 MB) including a sub-range of logical addresses in the zone which the flash storage device may expose to a host for overwrites. In response to a commit operation from either the host or the flash storage device, the flash storage device may move this predefined region size (a ZRWA window) to a next sub-range of logical addresses in the zone. As an example, when the host issues a zone write command including a logical page of sequential or random data to a zone supporting a ZRWA, the flash storage device may initially store that logical page in a superblock allocated for initial writes to that zone in non-volatile memory, and the flash storage device may move a write pointer to the next logical address in the zone within the ZRWA window. The flash storage device may also create an associated L2P entry for that initially written zone data in the L2P mapping table. If the host issues a zone write command indicating a same logical address as a previously issued zone write command (e.g., a data overwrite) within the ZRWA window, then rather than aborting the write command as previously described, the flash storage device may store that next logical page in a non-volatile staging area which is part of overprovisioning and is allocated for overwrites to multiple zones in non-volatile memory. For example, although most of the host data written to a zone is sequential in nature, a small percentage of host writes (e.g., 2%-5% of host writes) may be random in nature, and so the host may issue a zone write command including such random data to overwrite previously written sequential data. The flash storage device may similarly create an associated L2P entry for that overwritten zone data in the L2P mapping table.

On the other hand, if the host issues a zone write command indicating a next logical address in the sequence corresponding to the current location of the write pointer, the flash storage device may store that next logical page in the superblock allocated for initial writes to that zone and again move the write pointer to the next logical address in the zone within the ZRWA window. Data may thus continue to be written or overwritten, L2P entries created, and the write pointer moved within the ZRWA window until either the host issues an explicit commit command, or until the ZRWA window becomes full (e.g., the entire sub-range of logical addresses in the ZRWA window have been written, triggering an implicit commit command by the flash storage device). In response to the commit operation, the flash storage device moves the ZWRA window to the next sub-range of logical addresses in the zone (e.g., a subsequent 1 MB, predefined region size) beginning after the last committed logical address (e.g., beginning at the current position of the write pointer), and data writes or overwrites within the new ZRWA window may proceed in a similar manner as previously described. Similarly, the flash storage device may continue to create associated L2P entries for that zone data in the L2P mapping table. If a certain number of overwrites to the non-volatile staging area allocated for overwrites to multiple zones in non-volatile memory is determined (e.g., if more than 2-3% of the memory capacity of the flash storage device includes data overwrites to one or more zones), the controller may recycle respective zone data from that non-volatile staging area to the allocated superblocks for respective zones to achieve compaction of valid zone data in allocated superblocks for respective zones.

As a result, an L2P mapping table in ZNS may occupy a significant amount of volatile memory. For instance, a typical L2P mapping table may store an L2P entry for every logical page in every active zone and inactive zone, including mappings for sequential data and random data written and overwritten in ZRWAs. The amount of memory utilized by such L2P mapping tables may be proportional to the flash memory capacity of the flash storage device. For example, if one logical page in an L2P entry covers address translation(s) for 16 kB of host data and one L2P entry occupies 4 bytes of memory, then an 8 TB SSD (a flash storage device storing 8 TB of host data) may include 536,870,912 L2P entries in total occupying 2 GB of volatile memory for the entire L2P mapping table. Therefore, it would be helpful to reduce the significant amount of volatile memory occupied by an L2P mapping table in ZNS architectures.

Accordingly, to reduce the memory footprint occupied by such L2P mapping tables, a controller of the flash storage device may apply a hybrid L2P mapping system in which different address translation methods are applied for active zones and inactive zones. First, rather than maintaining an L2P mapping table in volatile memory to include L2P mapping entries for every zone (active and inactive), the controller here may maintain the L2P mapping table to include L2P entries for only active zones. Second, rather than storing the L2P entries for inactive zones in the L2P mapping table in volatile memory, the controller may maintain a superblock mapping table in volatile memory including one-to-one mappings of zones to superblocks.

More particularly, with respect to active zones, the controller may divide the L2P mapping table into separate regions for each active zone. For instance, in a region of the L2P mapping table allocated for active zone '0', the controller may store entries in the L2P mapping table for every logical page in active zone '0', while in another region of the L2P mapping table allocated for active zone '1', the controller may store entries in the L2P mapping table for every logical page in active zone '1', and so forth. The controller may dynamically assign each region of the L2P mapping table to a different zone based on its active zone list. For example, if the current active zone list includes zones '132', '455', etc., the L2P mapping table region for active zone '0' may include the L2P entries for zone '132', the L2P mapping table region for active zone '1' may include the L2P entries for zone '455', etc. Whenever the controller writes host data to an active zone in response to a zone write command, the controller may add an associated L2P entry to the corresponding region of that zone in the L2P mapping table accordingly. Moreover, whenever the controller reads host data from an active zone in response to a zone read command, the controller may identify, in the region of the L2P mapping table designated for that active zone, the physical address associated with the logical address indicated in the zone read command.

Moreover, with respect to inactive zones, the controller may maintain a superblock mapping table in volatile memory including associations of these zones respectively to individual, previously allocated superblocks. For instance, as previously described, in response to a zone open/write command, an active zone may be allocated with a superblock. However, as L2P entries for that active zone are already in the L2P mapping table, the controller may not include the association of that zone to the superblock in the superblock mapping table while the zone is an active zone. Once the controller receives a zone finish command explicitly from the host, or once the controller implicitly executes a zone finish in response to determining data has been written to the entire zone, the controller may deactivate the active zone into an inactive zone, and the controller may add the association of that zone to the superblock in the superblock mapping table. For instance, the controller may create a mapping entry in the superblock mapping table which indicates the association of the zone with the superblock. The controller may also remove the L2P entries associated with this newly inactive zone from the L2P mapping table to result in the L2P mapping table continuing to include only L2P address mappings for active zones. If a zone reset command is later received from the host for that inactive zone, the controller may remove the mapping of that zone to the superblock in the superblock mapping table.

Moreover, the controller may write host data to a superblock associated with an active zone in a pre-defined or fixed order of logical pages, rather than writing any logical page arbitrarily to wherever an available physical location exists. For example, in response to receiving one or more zone write commands to write logical pages of host data to the zone (e.g., logical page '0', '1', etc.), the controller may write logical page '0' to a particular physical page in a particular block of a particular plane of a particular memory die, logical page '1' to another particular physical page in the particular block of the particular plane of a particular memory die, and so forth according to the pre-defined order of logical pages until the superblock is fully written and a zone finish occurs (explicitly or implicitly). In response to the zone finish, the zone becomes an inactive zone, and a mapping of that zone to the superblock is added to the superblock mapping table. Thus, whenever the host issues a zone read command for data in a particular inactive zone, the controller may not refer to the L2P mapping table for address translation but instead utilize the superblock mapping table to calculate the physical address of the data. For example, the controller may identify the superblock associated with the inactive zone from the superblock mapping table, and since the data was written to the superblock in a fixed order as previously described, the controller may determine or calculate the offset or physical page in the identified superblock from the logical address indicated in the zone read command.

Therefore, as a result of maintaining an L2P mapping table in volatile memory with L2P entries for only active zones (rather than an L2P mapping table with entries for every zone including inactive zones), which in turn may be facilitated by maintaining a superblock mapping table in volatile memory for inactive zones rather than storing associated L2P entries for inactive zones in the L2P mapping table in volatile memory, the controller may significantly reduce the amount of memory occupied by L2P address translations in ZNS. For example, a flash storage device including ZNS may store host data in over a thousand zones, even though a very small fraction of these zones may be active at one time (e.g., fourteen out of a thousand zones). Therefore, by limiting the L2P mapping table to only include entries for active zones, the total amount of memory occupied by the L2P mapping table in volatile memory may be immensely reduced. Moreover, the superblock mapping table itself may occupy far less memory than the L2P mapping table (e.g., a few kB of data in superblock mappings compared to 2 GB of data typically in L2P address mappings), allowing the controller to more efficiently utilize its memory to perform address translations for inactive zones. Additionally, the superblock mapping table may allow address translations to be performed in significantly less time than those using the L2P mapping table, since the amount of time the controller may spend to perform calculations based on the superblock mapping to arrive at the physical offset of the host data may be less than the amount of time the controller may spend to obtain address translations from the L2P mapping table or other lookup table. Thus, performance of zone read commands may be improved with faster speeds and less costly operation at the controller. Additionally, performance of zone write commands may be improved since the reduced size of the L2P mapping table may allow for increased overprovisioning in the non-volatile memory.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host 104 may also include a host memory buffer (HMB 105). The HMB 105 is a portion of host memory (e.g., host memory 103 or a different memory in host 104) that the host 104 may allocate to the storage device 102 to utilize for the storage device's own purposes. For instance, the storage device 102 may utilize the HMB 105 as an address mapping table cache or a data cache. In some examples, the HMB 105 may include volatile memory, such as RAM, DRAM, or SDRAM (e.g., DDR1, DDR2, DDR3, DDR3L, LPDDR3, DDR4, and the like). In other examples, the HMB 105 may include non-volatile memory.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of NVM memory locations 112 which may store system data for operating the storage device 102 or user data received from the host for storage in the storage device 102. For example, the NVM may have a cross-point architecture including a 2-D NAND array of NVM memory locations 112 having n rows and m columns, where m and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, and/or penta-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art.

The storage device 102 also includes one or more volatile memories 117, 118 that can, for example, include a Dynamic Random Access Memory (DRAM) or a Static Random Access Memory (SRAM). For example, as illustrated in FIG. 1, volatile memory 117 may be an SRAM internal to (or integrated into) controller 123 of the storage device 102, while volatile memory 118 may be a DRAM external to (or remote from) controller 123 of the storage device 102. However, in other examples, volatile memory 117 may be a DRAM external to controller 123 and volatile memory 118 may be an SRAM internal to controller 123, volatile memory 117, 118 may both be internal to controller 123 or both be external to controller 123, or alternatively, storage device 102 may include only one of volatile memory 117, 118. Data stored in volatile memory 117, 118 can include data read from the NVM 110 or data to be written to the NVM 110. In this regard, the volatile memory 117, 118 can include a write buffer or a read buffer for temporarily storing data.

The memory (e.g. NVM 110) is configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Each of the data 119 may be associated with a logical address. For example, the volatile memory 118 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a physical address associated with each memory location 112 in the NVM where data is stored. While FIG. 1 illustrates a single L2P mapping table 120 stored in volatile memory 118, in other examples, the L2P mapping table 120 may include multiple tables stored in volatile memory 118. Mappings may be updated in the L2P mapping table 120 respectively in response to host writes, and periodically the L2P mapping table 120 may be flushed from volatile memory 118 to one or more of the NVM memory locations 112 of NVM 110 so that the mappings may persist across power cycles. In the event of a power failure in storage device 102, the L2P mapping table 120 in volatile memory 118 may be recovered during initialization from the L2P entries previously stored in NVM 110.

Figure 2:
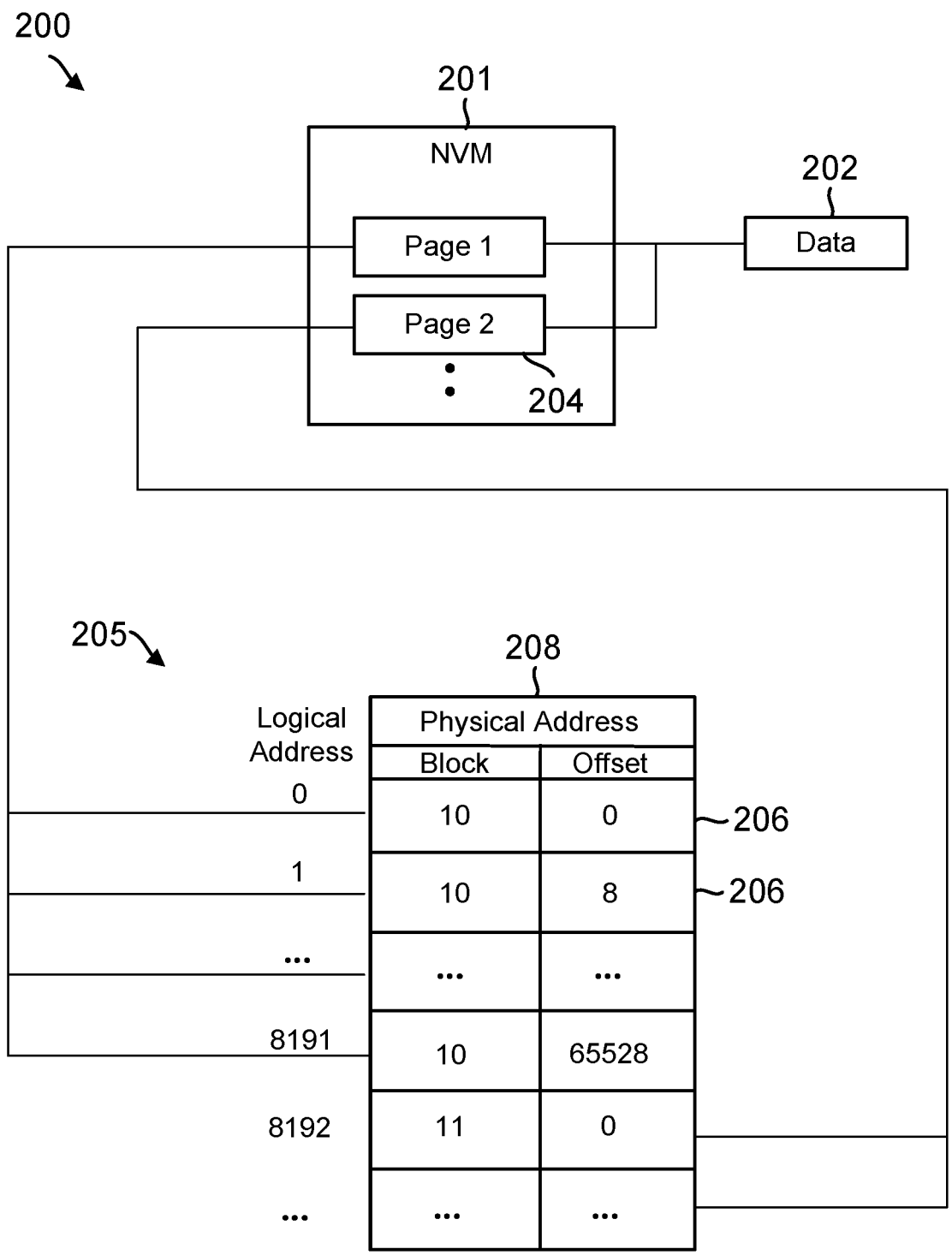
FIG. 2 is a conceptual diagram illustrating an example of a logical-to-physical (L2P) mapping table in a non-volatile memory of the storage device of FIG. 1.

FIG. 2 is a conceptual diagram 200 of an example of an L2P mapping table 205 stored in volatile memory (e.g., the volatile memory 118 of FIG. 1) illustrating the mapping of data 202 received from a host device to logical addresses and physical addresses in NVM 201 (e.g., the NVM 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM 201. Each page 204 may be associated with a mapping set including one or more entries 206 of the L2P mapping table 205 respectively identifying a physical address 208 mapped to a logical address (e.g., a logical block address (LBA)) associated with the data written to the NVM. A logical page may include one or more of the entries 206. An LBA may be a logical address specified in a write command for the data received from the host device. Physical address 208 may indicate the block and the offset at which the data associated with an LBA is physically written, as well as a length or size of the written data (e.g. 4 KB or some other size). In the illustrated example, page 204 encompassing 32 KB of data 202 may be associated with a mapping set including 8192, 4 KB entries. However, in other examples, page 204 may encompass a different amount of host data (e.g. other than 32 KB of host data) or may include a different number of entries 206 (e.g., other than 8192 entries), or entries 206 may respectively include different host data lengths (e.g., other than 4 KB each).

Referring back to FIG. 1, the NVM 110 includes sense amplifiers 124 and data latches 126 connected to each NVM memory location 112. For example, the NVM memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the NVM memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof.

The controller 123 is configured to receive data transferred from one or more of the cells 116 of the various NVM memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the volatile memory 118 when reading or writing data to the cells 116. For example, the controller 123 may receive logical-to-physical address mappings from the volatile memory 118 in response to read or write commands from the host device 104, identify the physical addresses mapped to the logical addresses identified in the commands (e.g. translate the logical addresses into physical addresses), and access or store data in the cells 116 located at the mapped physical addresses. The controller 123 is also configured to access the L2P mapping table 120 in the NVM 110, for example, following a power failure during initialization, to recover or populate the L2P mapping table 120 in the volatile memory 118.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a NVM memory location 112 in the NVM 110 of storage device 102 for storing the data. The controller 123 stores the L2P mapping in the L2P mapping table 120 to map a logical address associated with the data to the physical address of the NVM memory location 112 allocated for the data. The controller 123 then stores the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the L2P mapping table 120 to translate the logical addresses specified in the read command to the physical addresses indicating the location of the data. The controller 123 then reads the requested data from the NVM memory location 112 specified by the physical addresses by sensing the data using the sense amplifiers 124 and storing them in data latches 126 until the read data is returned to the host 104 via the host interface 106.

Figure 3:
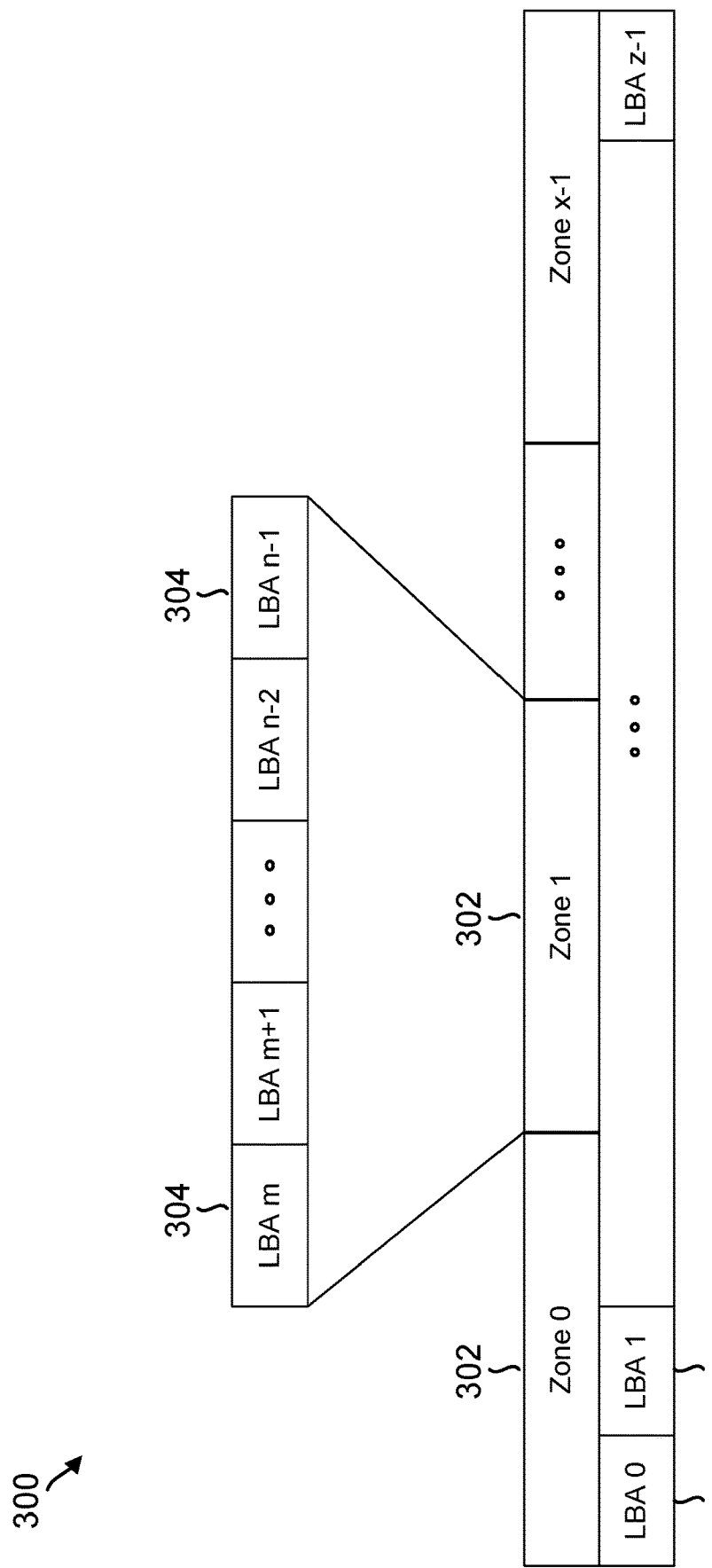
FIG. 3 is a conceptual diagram illustrating an example of zones in the storage device of FIG. 1.

FIG. 3 illustrates a conceptual diagram 300 of an example of zones 302. Each zone 302 is fixed in size and includes a contiguous range of sequential logical addresses 304 in the NVM 110. For instance as illustrated, the NVM 110, 201 may include a total of z LBAs that are divided into x zones, with each zone including a range of n–m sequential LBAs, where z represents the total number of sectors in flash memory, x represents the number of zones, m represents a first LBA in a zone, and n–1 represents a last LBA in the same zone. Each zone may be separately used by the host for storing data associated with one or more applications run by the host. The controller 123 may calculate the number of zones, and thus determine the different ranges of sequential logical addresses 304 in the various zones, based on a fixed zone size and the capacity of storage device 102. For example, if the capacity of the storage device is 8 TB and the fixed zone size is 1 GB, the controller 123 may determine the number of zones to be 8000 in response to dividing the storage device capacity by the fixed zone size (8 TB/1 GB=8000).

The controller 123 may determine a definition of the zones 302 (e.g. groups of logical addresses 304) in the storage device 102. For example, the controller 123 may determine that one group of LBAs, or logical block, is associated with a first zone, that another group of LBAs, or logical block, is associated with a second zone, and so forth. The controller 123 may then map each logical block to one or more physical blocks in the NVM 110. For instance, the controller 123 may map the LBAs associated with the first zone to a first superblock (e.g., one or more of the NVM memory locations 112), the LBAs associated with the second zone to a second superblock (e.g., a different one or more of the NVM memory locations 112), and so forth. The controller 123 may then write and read data 119 in the physical block(s) associated with the zones 302. For example, when writing data to a zone, the controller 123 may create associated L2P entries for that zone data in the L2P mapping table 120, 205 in volatile memory 118, and the data associated with respective logical addresses may be written wherever available in one or more superblocks associated with the zone.

Typically in ZNS, host data (e.g., data 119, 202) is sequentially written to a zone. For example, whenever the host 104 issues a zone write command in which it sends the controller 123 a logical page of data to be written to the NVM 110, 201 at a given logical address, the controller 123 moves a write pointer to the next logical address in the zone 302, and the host 104 is expected to send data for that next logical page when issuing a subsequent zone write command. If the host does not follow this sequence (e.g., if the next write command from the host includes a logical address which is out of order in the sequence, such as a same logical address in an attempted data overwrite), the controller 123 may issue an error and abort the zone write. For instance, referring to FIG. 3, if the host 104 initially writes data in LBA 0 of zone 0 and subsequently sends a write to command to overwrite data in LBA 0 of zone 0, the controller 123 may generate an error since it did not receive a command to write in expected LBA 1. As a result, host 104 generally may not overwrite sequential data at a given logical address in a zone until after the zone is fully written. However, ZNS may be extended to support data overwrites in a zone within a ZRWA associated with that zone.

Figure 4:
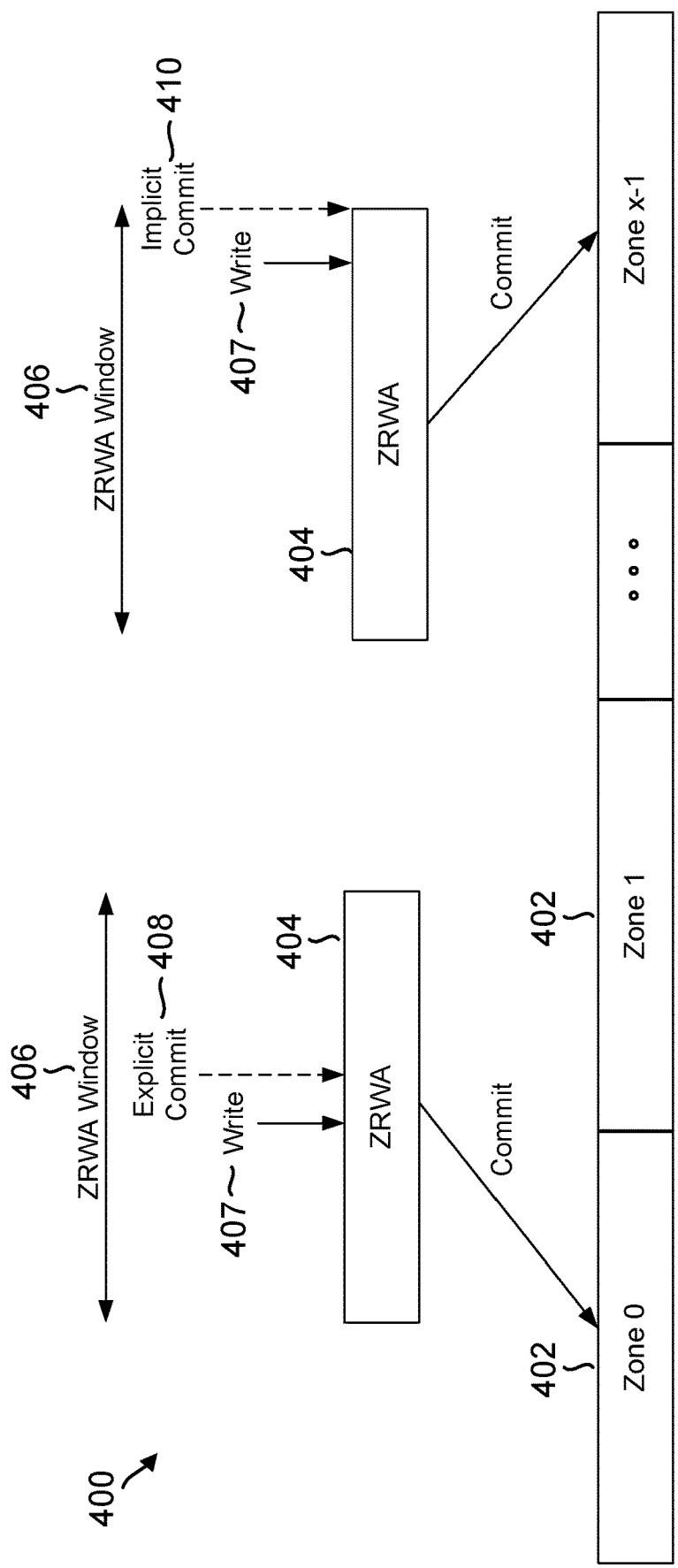
FIG. 4 is a conceptual diagram illustrating an example of a zone random write area (ZRWA) associated with respective zones in the storage device of FIG. 1.

FIG. 4 illustrates a conceptual diagram 400 of an example of zones 402 respectively associated with a ZRWA 404. Initially, the host 104 may send the controller 123 a zone open command to open a zone 402 in a ZRWA mode, and this mode may remain associated with the zone 402 until the zone is finished. For a zone 402 opened in a ZRWA mode, the controller 123 may define a ZRWA window 406 of a predefined region size (e.g., 1 MB) including a sub-range of logical addresses in the zone which the controller 123 may expose to the host 104 for overwrites. In response to a commit operation from either the host 104 or the controller 123, the controller may move the ZRWA window 406 to a next sub-range of logical addresses in the zone 402. As an example, when the host 104 issues a zone write command including a logical page of sequential or random data to a zone 402 supporting a ZRWA 404, the controller 123 may initially store that logical page in a superblock allocated for initial writes to that zone in the NVM 110, 201, and the controller 123 may move a write pointer 407 to the next logical address in the zone 402 within the ZRWA window 406. The controller may also create an associated L2P entry 206 for that initially written zone data in the L2P mapping table 120, 205. If the host 104 issues a zone write command indicating a same logical address as a previously issued zone write command (e.g., a data overwrite) within the ZRWA window 406, then rather than aborting the write command as previously described, the controller 123 may store that next logical page in a non-volatile staging area which is part of overprovisioning and is allocated for overwrites to multiple zones in non-volatile memory. The controller 123 may similarly create an associated L2P entry 206 for that overwritten zone data in the L2P mapping table 120, 205.

On the other hand, if the host 104 issues a zone write command indicating a next logical address in the sequence corresponding to the current location of the write pointer 407, the controller 123 may store that next logical page in the superblock allocated for initial writes to that zone 402 and again move the write pointer 407 to the next logical address in the zone within the ZRWA window 406. Data may thus continue to be written or overwritten, L2P entries 206 created, and the write pointer 407 moved within the ZRWA window 406 until either the host 104 issues an explicit commit command 408, or until the ZRWA window 406 becomes full (e.g., the entire sub-range of logical addresses in the ZRWA window have been written, triggering an implicit commit command 410 by the controller 123). In response to the commit operation, the controller 123 may move the ZWRA window 406 to the next sub-range of logical addresses in the zone 402 (e.g., a subsequent 1 MB, predefined region size) beginning after the last committed logical address (e.g., beginning at the current position of the write pointer), and data writes or overwrites within the new ZRWA window may proceed in a similar manner as previously described. Similarly, the controller 123 may continue to create associated L2P entries for that zone data in the L2P mapping table 120, 205. If a certain number of overwrites to the non-volatile staging area allocated for overwrites to multiple zones in the NVM 110, 201 is determined (e.g., if more than 2-3% of the memory capacity of the NVM 110, 201 includes data overwrites to one or more zones), the controller 123 may recycle respective zone data from that non-volatile staging area to the allocated superblocks for respective zones to achieve compaction of valid zone data in allocated superblocks for respective zones.

FIG. 5 illustrates an example 500 of a list of active zones 502 (e.g., zones 302, 402 that are open or available for zone writes) which the controller 123 may maintain in a ZNS architecture. Initially, to write data to a zone 302, 402, the host 104 may send a zone open command or a zone write command to the controller 123. In response to the zone open/write command, the controller 123 may add the zone 302, 402 to the list of active zones 502, allocate a superblock to this active zone 502, and the controller 123 may write data 119, 202 to the zone 302, 402 at the indicated logical address in the command (e.g., as previously described in FIG. 1 with respect to write commands). The controller 123 may also create an entry 206 associated with that zone write command in the L2P mapping table 120, 205. Afterwards, the host 104 may continue to send zone write commands to write additional host data at subsequent logical addresses associated with the active zone 502. In response to these respective zone write commands, the controller 123 may create additional entries 206 respectively in the L2P mapping table 120, 205 and store the additional host data in the superblock associated with that active zone 502. The host 104 may also issue zone read commands for data respectively in indicated logical addresses at the associated zone, in response to which commands the controller 123 may identify the physical addresses of the associated blocks from the L2P mapping table 120, 205 and read the data 119, 202 from those physical addresses 208 accordingly (e.g., as previously described in FIG. 1 with respect to read commands).

Once the zone 302, 402 is full (e.g., no further data 119, 202 can be written to that active zone 502), or if the host 104 does not intend to write data further to that zone (e.g., even if the zone is only partially full), the host 104 may send a zone finish command to the controller 123 indicating to close the active zone 502 or otherwise change its status to an inactive zone. In response to the zone finish command, the controller 123 may remove the zone 302, 402 from the list of active zones 502 and not accept any more zone write commands to that zone 302, 402. However, since the host 104 may still issue zone read commands to read data 119, 202 from that zone, the controller 123 continues to maintain the L2P mapping table 120, 205 with the previous L2P mapping entries for each logical address in that newly inactive zone. Later on, if the host 104 determines to re-use the zone 302, 402 (e.g., for a different application), the host may issue a zone reset command to the controller 123 indicating to reset the zone 302, 402. In response to the zone reset command, the controller 123 may individually remove the L2P mapping entries associated with that zone 302, 402 (e.g., to prevent invalid data from being accessed from that zone), and the controller 123 may afterwards write new host data to that zone with associated L2P mapping entries in response to subsequent zone open/zone write commands.

As a result, in ZNS architectures, L2P mapping table 120, 205 may occupy a significant amount of volatile memory 118. For instance, L2P mapping table 120, 205 may store one or more entries 206 for every logical page in every active zone 502 and inactive zone, including mappings for sequential data and random data updated in ZRWAs 404. The amount of memory utilized by such L2P mapping table 120, 205 may be proportional to the flash memory capacity of the storage device 102. For example, if one logical page in an L2P entry (e.g., entry 206) covers address translation(s) for 16 kB of host data and one L2P entry occupies 4 bytes of memory, then an 8 TB SSD (a flash storage device storing 8 TB of host data) may include 536,870,912 L2P entries in total occupying 2 GB of volatile memory 118 for the entire L2P mapping table. Therefore, to reduce the significant amount of volatile memory 118 occupied by L2P mapping table 120, 205 in ZNS architectures, including the size of the L2P mapping table 120, 205, the controller 123 may apply a hybrid L2P mapping system in which different address translation methods are applied for active zones 502 and inactive zones (zones 302, 402 not in the list of active zones 502). Details of this hybrid L2P mapping system are described below with respect to the following Figures.

FIG. 6 illustrates an example 600 of an L2P mapping table 602 (e.g., L2P mapping table 120, 205) which the controller 123 may maintain in volatile memory 118 that includes L2P entries (e.g., entries 206) for only the active zones 502. The controller 123 may divide the L2P mapping table 602 into separate regions 604 for each active zone 502. For instance, in a region 604 of the L2P mapping table 602 allocated for active zone '0', the controller 123 may store L2P entries for every logical page in active zone '0', while in another region 604 of the L2P mapping table 602 allocated for active zone '1', the controller 123 may store L2P entries for every logical page in active zone '1', and so forth. The controller 123 may dynamically assign each region 604 of the L2P mapping table 602 to a different zone 302, 402 based on its active zone list. For example, if the current list of active zones 502 includes zones '132', '455', etc., the L2P mapping table region for active zone 0 may include the L2P entries for zone '132', the L2P mapping table region for active zone 1 may include the L2P entries for zone '455', etc. Whenever the controller 123 writes host data to an active zone 502 in response to a zone write command, the controller 123 may add an associated L2P entry to the corresponding region 604 of that zone in the L2P mapping table 602 accordingly. Moreover, whenever the controller 123 reads host data from an active zone 502 in response to a zone read command, the controller 123 may identify, in the region 604 of the L2P mapping table 602 designated for that active zone 502, the physical address associated with the logical address indicated in the zone read command.

FIG. 7 illustrates an example 700 of a superblock mapping table 702 which the controller 123 may maintain in volatile memory 118 that includes one-to-one mappings of zones 302, 402 (e.g., L inactive zones not in the list of active zones 502) respectively to individual superblocks 704 in the NVM 110, 201 (e.g., groups of physical blocks across memory dies such as multiple ones of NVM memory locations 112). As previously described, in response to a zone open/write command, an active zone 502 may be allocated with a superblock 704. However, as L2P entries for that active zone are already in the L2P mapping table 602, the controller 123 may not include the association of that zone to the superblock 704 in the superblock mapping table 702 while the zone is an active zone 502. Once the controller 123 receives a zone finish command deactivating the active zone 502 into an inactive zone, the controller may add the association of that zone 302, 402 to the superblock 704 in the superblock mapping table 702. For instance, the controller 123 may create a mapping entry in the superblock mapping table 702 which indicates the association of the zone 302, 402 with the superblock 704. The controller 123 may also remove the L2P entries associated with this newly inactive zone from the L2P mapping table 602 to result in the L2P mapping table continuing to include only L2P address mappings for active zones 502. If a zone reset command is later received from the host 104 for that inactive zone, the controller 123 may remove the mapping of that zone to the superblock 704 in the superblock mapping table 702.

Moreover, the controller 123 may write host data to a superblock 704 associated with a zone 302, 402 (an active zone 502) in a pre-defined or fixed order of logical pages, rather than writing any logical page arbitrarily to wherever an available physical location exists. For example, in response to receiving one or more zone write commands to write logical pages of host data to an active zone 502 (e.g., logical page '0', '1', etc.), the controller may write logical page '0' to a particular physical page in a particular block of a particular plane of a particular memory die of the superblock 704, logical page '1' to another particular physical page in the particular block of the particular plane of a particular memory die of the superblock 704, and so forth according to the pre-defined order of logical pages until the superblock is fully written and a zone finish command is received. More details are described with respect to FIG. 10. In response to receiving the zone finish command, the zone 302, 402 becomes an inactive zone, and a mapping of that zone to the superblock 704 is added to the superblock mapping table 702. Thus, whenever the host 104 issues a zone read command for data 119, 202 in a particular inactive zone, the controller 123 may not refer to the L2P mapping table 120, 205, 602 for address translation but instead utilize the superblock mapping table 702 to calculate the physical address of the data 119, 202. For example, the controller 123 may identify the superblock 704 associated with the inactive zone from the superblock mapping table 702, and since the data was written to the superblock in a fixed order as previously described, the controller 123 may determine or calculate the offset or physical page in the identified superblock from the logical address indicated in the zone read command.

FIGS. 8A-8C illustrate example flow charts 800, 820, 840 of methods for handling different zone management operation commands incorporating the hybrid L2P mapping approach. For example, the methods can be carried out in a storage device 102 such as the one illustrated in FIG. 1. Each of the steps in the flow chart can be controlled using the controller as described below (e.g. controller 123), by a component or module of the controller, or by some other suitable means.

Referring to FIG. 8A, as represented by block 802, the controller 123 may receive a zone open command or a zone write command from the host 104. In response to the command, as represented by block 804, the controller 123 may associate a physical block or other resource (e.g., a superblock) with an active zone 502. Moreover, as represented by block 806, every time the controller writes to that associated resource, the controller 123 may update the L2P mapping table 602. The controller 123 may not write to the resource if the zone is inactive (and thus similarly will not update the L2P mapping table 602 for inactive zones), since a write command to an inactive zone would result in an error.

For instance, the controller 123 may maintain a list of active zones 502 up to a maximum number of active zones N, and if the host 104 intends to issue a write command for any active zone beyond N (e.g., N+1), the host may instruct the controller to close one active zone and make the new zone indicated in the write command an active zone. As an example, if there are a maximum of 14 active zones and the controller writes to a fifteenth zone '900', the controller may not directly convert zone '900' into an active zone if N active zones already exist. Rather, the host 104 first sends a zone finish command closing one of the active zones 502 so that there will be a free entry for a new zone in the list of active zones, and then the host may write to zone '900' and the controller may convert to zone '900' an active zone accordingly. Thus, the controller 123 may only write to active zones 502. Moreover, whenever a write command is received for an active zone, then instead of accessing the associated L2P entry directly in the L2P mapping table 120, 205 to update, the controller may access the particular region 604 of the L2P mapping table 602 associated with the active zone 502 and determine the particular L2P entry in that region to update. For example, the controller may calculate the region 604 in the L2P mapping table associated with the zone 302, 402 being written, as well as the particular offset or logical address associated with the zone write command, and the controller 123 may access that region and offset to find the correct L2P entry to update.

Referring to FIG. 8B, as represented by block 822, the controller 123 may receive a zone finish command explicitly from the host 104, or a zone finish may implicitly occur if the active zone resource (e.g., the superblock) has been fully written with data. For example, after the controller 123 writes host data sequentially to a superblock 704 associated with an active zone 502, a zone finish may occur instructing the controller to remove the zone 302, 402 from its list of active zones 502. In response to the zone finish, as represented by block 824, the controller 123 may update the superblock mapping table 702 with an association of the zone to the superblock 704 since the controller may no longer write to that superblock 704 associated with the inactive zone. Moreover, as represented by block 826, the controller 123 may un-map the region 604 of the L2P mapping table 602 associated with that particular zone. For example, the controller may remove or clear the L2P entries in that region 604 associated with the previously active zone.

Thus, in response to the zone finish, the zone may be removed from the active zone list, the superblock mapping table 702 may be updated with an entry of that zone to the superblock 704, and the L2P entries associated with that zone may be un-mapped from the corresponding region 604. After clearing the L2P entries from that region 604, the controller may utilize that region for the next active zone. As a result, rather than waiting for prior zone L2P entries to be cleared when the host intends to reset the zone to write new data, the controller may accomplish this clearing earlier in response to the zone finish, saving time in the zone writing process. Moreover, after the controller receives a subsequent zone open command or zone write command from the host for the new zone, the controller may associate that free active zone with the new zone and perform L2P updates in the same region that it previously cleared, since the region 604 corresponding to that active zone is now associated with the new zone.

Referring to FIG. 8C, as represented by block 842, the controller 123 may receive a zone reset command from the host 104. For example, after the controller 123 deactivates the zone 302, 402 and prevents further writes to the superblock 704 associated with that inactive zone, the controller 123 may receive the zone reset command instructing the controller to invalidate the host data in the superblock 704 associated with that zone 302, 402. In response to the zone reset command, as represented by block 844, the controller 123 may remove the previously made entry associating that zone with superblock 704 from the superblock mapping table 702 so that no association remains between the zone and the superblock 704. Moreover, as represented by block 846, the controller 123 may instantaneously set a valid page count (VPC) associated with the superblock 704 to zero. For instance, rather than gradually decreasing the VPC to 0 based on invalidation of host data through clearing associated L2P entries in the L2P mapping table, here the controller may instantaneously set the VPC to 0 since the L2P entries have already been cleared and the invalidation of the entire zone occurs in response to removing of the single mapping between the inactive zone and the superblock from the superblock mapping table 702.

As a result, the controller may quickly reset a zone by clearing its association in the superblock mapping table 702 and resetting its VPC, which process may be much faster than if the controller cleared out individual L2P entries from the L2P mapping table 120, 205 during a zone reset. Since no L2P entries for that zone exist in the L2P mapping table 602 and since no mapping of that zone to the superblock 704 exists in the superblock mapping table 702, the data stored in the superblock previously associated with that zone is invalidated. Moreover, following the zone reset, the host may write new data (e.g., overwrite) to that same zone in a different superblock following activation of the zone in response to a subsequent zone open or write command.

Figure 9:
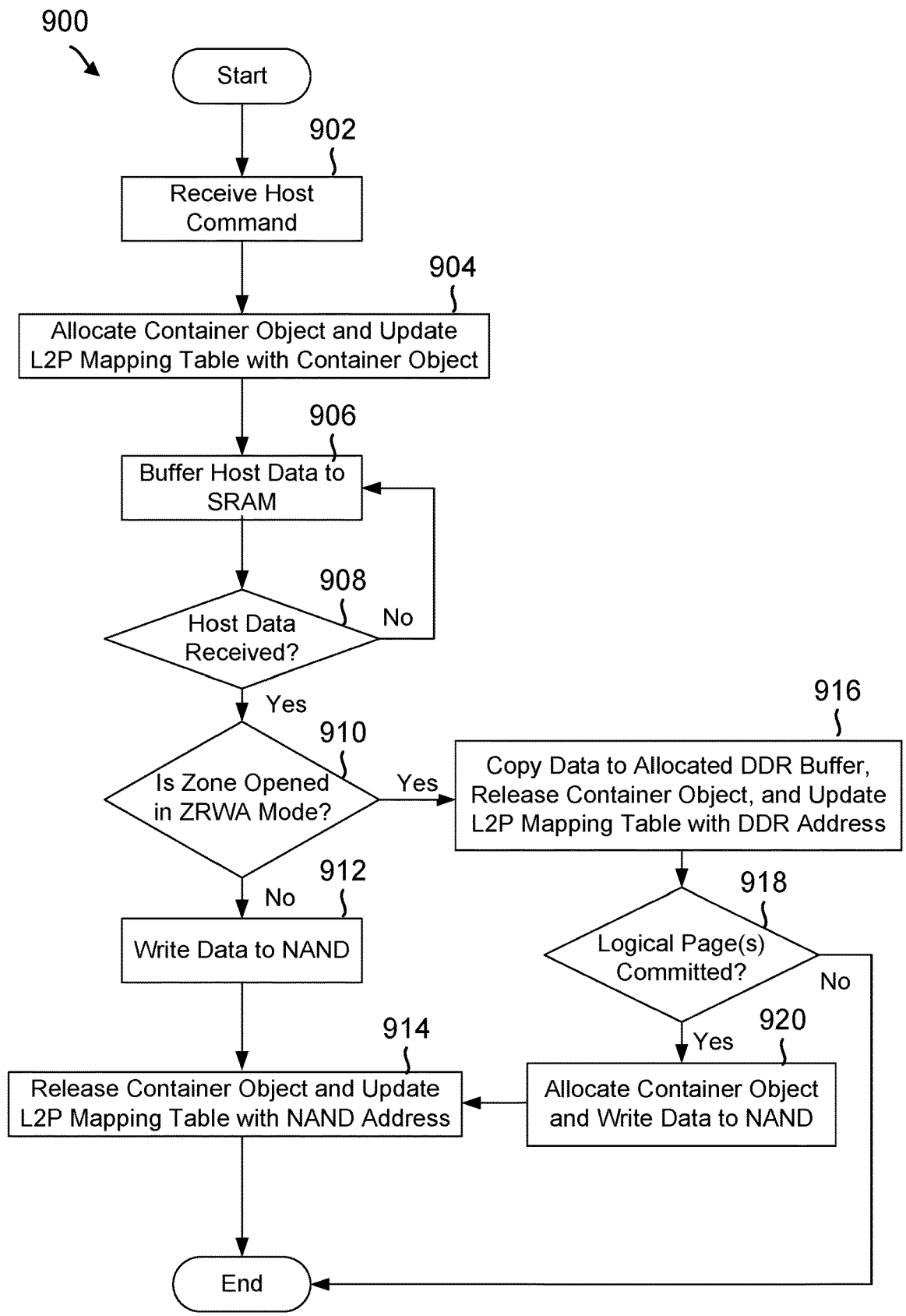
FIG. 9 is a flow chart illustrating an example of a method for updating an L2P mapping table including L2P entries associated with zones in the storage device of FIG. 1.

FIG. 9 illustrates an example flow chart 900 of a method for updating an L2P mapping table (e.g., L2P mapping table 120, 205, 602) including L2P entries (e.g., entries 206 in regions 604 of the L2P mapping table) associated with zones 302, 402. For example, the method can be carried out in a storage device 102 such as the one illustrated in FIG. 1. Each of the steps in the flow chart can be controlled using the controller as described below (e.g. controller 123), by a component or module of the controller, or by some other suitable means.

As represented by block 902, the controller may receive a host command, such as a zone write command, including a logical page with one or more logical addresses 208 and host data to be written to that logical page. Next, as represented by block 904, the controller may allocate a container object for the logical page in the L2P mapping table 120, 205, 602. The container object may include information regarding the logical page, such as a buffer in volatile memory 117 where the logical page is stored. The controller may further update the L2P mapping table with the container object, and as represented by block 906, the controller may buffer the host data included in the command to the volatile memory 117 (e.g., SRAM). For instance, referring to FIG. 1, the controller 123 may create a container object in L2P mapping table 120, 205, 602 in volatile memory 118 (e.g., DRAM) mapping the logical address or logical page associated with the command to a physical address in the volatile memory 117 where the host data is to be stored (e.g., an SRAM address), and as represented by block 908, the controller may monitor the status of the buffer until the host data is fully received or stored into the mapped physical address of the volatile memory 117 (e.g., SRAM).

Afterwards, as represented by block 910, the controller may check whether a zone associated with the host command is opened in a ZRWA mode or a sequential mode. For example, the controller 123 may determine whether a zone open command or a zone write command received from the host 104 indicates that an associated zone is to be opened in a ZRWA mode (rather than a sequentially preferred mode), and thus whether a ZRWA (e.g., ZRWA 404) is to be activated for the zone 302, 402 associated with the host command. If the controller determines that the zone 302, 402 is not opened in a ZRWA mode (the zone 302, 402 is a sequential zone), then as represented by block 912, the controller may write (e.g., flush) the host data from volatile memory 117 (e.g., SRAM) directly to the NVM 110, 201, and as represented by block 914, the controller may release the container object associated with that command in the L2P mapping table 120, 205, 602 and update the L2P mapping table with the physical address 208 in the NVM 110, 201 where the host data is written. For instance, the controller may write data 119, 202 from the volatile memory 117 to the superblock 704, and the controller may replace the container object associated with that data in the L2P mapping table 120, 205, 602 with an L2P entry mapping the associated logical address to the physical address in the NVM memory location 112 where the data is stored. The controller may perform these operations, for example, in response to determining from stored container objects that a full sequence page (FSP) (e.g., a collection of logical pages that matches the length of a physical page in the superblock 704, such as 24 4K pages covering 96 kB of host data) is available in the volatile memory 117 to be written to the NVM 110, 201. Moreover, when the controller writes the data to the superblock 704 (e.g., a superblock associated with a sequential zone), rather than writing the data in an arbitrary order based on first available physical pages or other dynamic order, here the controller writes the data in a pre-defined or fixed order. For example, the controller may write logical pages to the superblock in a sequential order (e.g., logical page '0' in physical page '0' of block '0' of memory die '0', logical page '1' in physical page '0' of block '0' of memory die '0', etc.). More details with respect to this sequential order is described below with respect to FIG. 10. As a result, when the zone becomes inactive in response to a zone finish, the controller may determine based on the superblock mapping table 702 which particular LBA offsets are written to which particular pages in the superblock.

Figure 10:
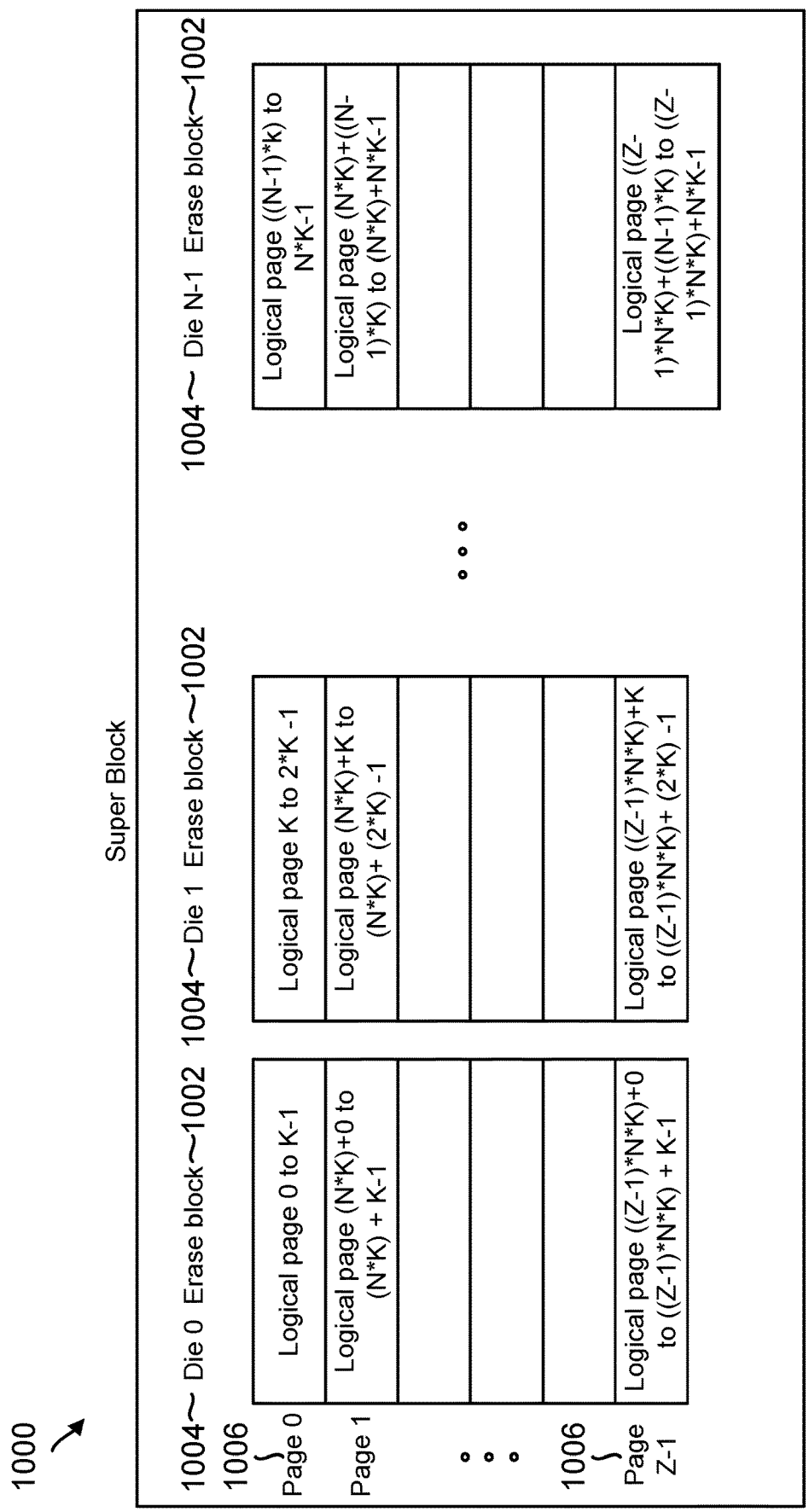
FIG. 10 is a conceptual diagram illustrating an example of a superblock in the storage device of FIG. 1.

FIG. 10 illustrates an example of a superblock 1000 (e.g., superblock 704) in the NVM 110, 201 of the storage device 102 where the controller 123 may write logical pages of data 119, 202 in response to zone write commands for the zone 302, 402 (e.g., active zone 502) associated with the superblock. Superblock 1000 may include a number N of erase block(s) or physical block(s) 1002 across one or more memory die(s) 1004, where each physical block 1002 includes a number Z of physical pages 1006 and where each physical page 1006 may store a number K of logical pages. Rather than writing the data in to the superblock in an arbitrary order (e.g., based on whichever physical pages 1006 or physical blocks 1002 are first available or by some other dynamic order), here the controller 123 may write the logical pages in a fixed order such as in a sequence of logical pages. For instance, the controller may write a first K logical pages into physical page '0' of physical block 1002 in die '0', followed by a next K logical pages into physical page '0' of physical block 1002 in die '1', and so forth until N*K logical pages have been written into physical page '0' of the N physical blocks or memory dies. Then, the controller may write a subsequent K logical pages into physical page '1' of physical block 1002 in die '0', followed by a further K logical pages into physical page '1' of physical block 1002 in die '1', and so forth until $(N*K)^2$ logical pages have been written in total across physical pages '0' and '1' of the N physical blocks or memory dies 1004. This process may repeat for all Z physical pages until $(N*K)^{Z-1}$ logical pages have been written in total across the Z physical pages of the N physical blocks or memory dies 1004, at which point the superblock 1000 is completely written. The controller may flush or write logical pages to the superblock 1000 in such order, for example, at block 912 of FIG. 9 after determining that at least one FSP is available in volatile memory 117.

Referring back to FIG. 9, if alternatively at block 910 the controller 123 determines that the zone 302, 402 associated with the host command is a ZRWA zone, then as represented by block 916, the controller may copy the host data from the volatile memory 117 (e.g., SRAM) to an allocated buffer in volatile memory 118 (e.g., DRAM) for the ZRWA associated with the zone. This DRAM buffer may have a same size as the size of the ZRWA window 406 associated with the zone (e.g., 1 MB), and the controller may maintain the host data in this DRAM buffer and allow in-place overwrites to this host data until a commit operation is received from the host. The controller may also release the container object including the volatile memory 117 address (e.g., the SRAM address) previously created at block 904, and the controller may update the L2P mapping table in the volatile memory 118 (e.g., in DRAM) with a new L2P entry including the volatile memory 118 address (e.g., the DRAM address) where the associated host data is stored.

Figure 11:
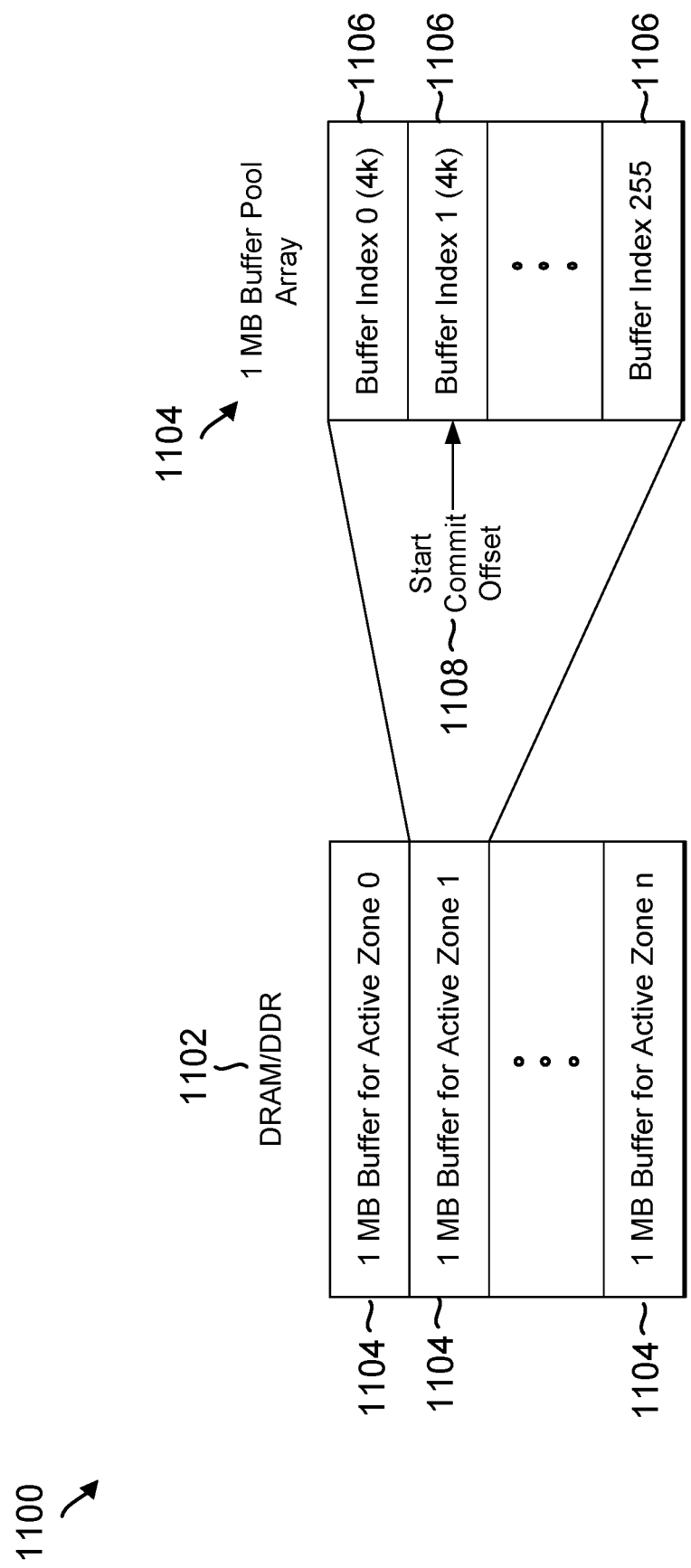
FIG. 11 is a conceptual diagram illustrating an example of a volatile memory including buffers associated with active zones supporting ZRWAs in the storage device of FIG. 1.

FIG. 11 illustrates an example 1100 of a volatile memory 1102 (e.g., volatile memory 118, such as a DDR SDRAM or other DRAM) including a plurality of buffer pools 1104 associated with respective active zones (e.g., active zones 502) in which the controller may temporarily store logical pages of host data (e.g., data 119, 202) for zones opened in a ZRWA mode. For instance, a buffer pool 1104 associated with a respective zone may be a circular array including a plurality of buffer indices 1106, and the controller 123 may store a logical page of host data (e.g., 4 kB of host data)

associated with the zone in the array at a memory address corresponding to an individual buffer index. The controller 123 may store data in a respective one of the buffer pools 1104 associated with a respective active zone, for example, at block 916 of FIG. 9. For example, the controller 123 may copy logical pages of host data from SRAM into respective buffer indices 1106 of the associated buffer pool 1104 in the DRAM following a determination that the associated zone includes a ZRWA (e.g., ZRWA 404).

The controller may store logical pages at available buffer indices in a sequential manner. For instance, in the illustrated example of FIG. 11, a first logical page including 4 kB of data for active zone 1 may be stored at buffer index '0' of the associated buffer pool, a second logical page including 4 kB of data may be stored at buffer index '1' of the same associated buffer pool, and so forth up to a maximum number of logical pages corresponding to the size of the buffer pool 1104. The controller may configure the size of a respective buffer pool 1104 for an active zone to match the size of the ZRWA window 406 associated with that active zone (e.g., 1 MB). This size matching, for example, may allow an implicit commit operation to occur in response to a same quantity of logical pages having been stored in the volatile memory 1102 as that which would have been written in a ZRWA window 406.

The controller 123 may flush or write data stored in a respective one of the buffer pools 1104 to an associated superblock 704, 1000 in the NVM 110, 201 in response to a commit operation command for the respective active zone (e.g., an explicit commit command 408 or implicit commit command 410). However, unlike the ZRWA window 406 which may move or extend the ZRWA 404 following a commit operation, the buffer pools 1104 are fixed in the volatile memory 1102. Therefore, to accommodate commit operations for data stored in a respective buffer pool 1104, the controller 123 may maintain a start commit offset pointer 1108 indicating the buffer index 1106 of an initial logical page that was stored in the buffer pool 1104 following a prior commit operation for the associated ZRWA 404. The start commit offset pointer 1108 may thus indicate the initial logical page (e.g., the initial logical page index (LPI) or logical address) that is to be flushed to the NVM 110, 201 in response to a next commit operation.

For instance, in the illustrated example of FIG. 11, in response to receiving an explicit commit command for active zone '1' before the buffer pool 1104 is fully occupied (or in response to generating an implicit commit command after that buffer pool 1104 is fully occupied), the controller 123 may determine to flush logical pages of data to the superblock 704, 1000 in the NVM 110, 201. In particular, the controller may write the data beginning with the logical page at buffer index '1' associated with active zone '1', until and including the logical page associated with the last buffer index where data was stored prior to the commit operation. Afterwards, the controller may move the start commit offset pointer 1108 to point to the buffer index 1106 for the next initial logical page to be committed. For instance, if in the illustrated example of FIG. 11, an explicit commit command was received after a logical page of data is stored at buffer index '128' in the buffer pool 1104 associated with active zone '1', the controller may write the data stored at buffer indices '1' through '128' to the super block 704, 1000 in the NVM 110, 201 in a fixed order such as described with respect to FIG. 10, and the controller may subsequently move the start commit offset pointer 1108 to point to buffer index '129'.

Thus, referring back to FIGS. 9 and 11, the controller 123 may maintain a buffer in volatile memory 118 (e.g., buffer pool 1104 in volatile memory 1102 such as DDR SDRAM or DRAM) for host data associated with a zone 302, 402 opened in a ZRWA mode, which data may be transferred to the buffer from the volatile memory 117 (e.g., SRAM) following receipt from host 104 of the host data in the SRAM. The controller 123 may initially receive a zone open command from the host 104 indicating the zone 302, 402 is a ZRWA zone (or otherwise indicating to allocate a ZRWA 404 for that zone), and when the controller 123 receives host data from the host that is intended to be written to that ZRWA zone, the controller 123 may copy the host data initially stored in volatile memory 117 to the maintained buffer in volatile memory 118 (e.g., buffer pool 1104). For example, for a respective logical page of data received from host 104, the controller may determine the next available buffer index in the active zone 502 (into which to copy the host data from the SRAM) as a function of the current LPI associated with that host data, the last committed LPI, the start commit offset pointer 1108, and the number of buffers in the buffer pool 1104 (e.g., the 1 MB buffer region). More particularly, this function may be the remainder of the sum of the difference between the current LPI and the last committed LPI and the start commit offset after dividing this sum by the number of buffers in the buffer pool 1104, as follows: DDR buffer index in a zone=((Current LPI−last committed LPI)+start_commit_offset) % (buffers_in_1 MB_region). The controller 123 may also release or remove the container object initially created at block 904 (e.g., the container object associating the logical address for that data with an SRAM address in the L2P mapping table 120, 205, 602 where the data is stored) and replace that entry with a new or updated L2P entry mapping the logical address for that data to the new physical address in the volatile memory 118 where the host data is stored (e.g., a DRAM address). In this way, resources in the SRAM may be freed for usage by other logical pages (e.g., for sequential zones).

Moreover, while the host data is being maintained (or overwritten) in the DRAM buffer for the ZRWA zone, as represented by block 918, the controller may check whether a commit operation has been received from the host 104 (e.g., an explicit commit command 408) or has occurred within the storage device 102 (e.g., an implicit commit command 410). If not, the controller 123 may repeat the aforementioned process for subsequent host commands. For example, when the controller 123 subsequently receives logical pages of data from the host 104 in volatile memory 117 (e.g., SRAM), the controller may copy the logical pages of data to the associated buffer in volatile memory 118 (e.g., the buffer pool 1104 in DRAM), and the controller 123 may perform in-place updates or overwrites of data associated with previously received logical pages in the associated buffer of volatile memory 118.

Alternatively, if the controller 123 receives a commit operation command from the host 104 or an implicit commit operation occurs, then as represented by block 920, the controller may allocate a container object in the L2P mapping table for the committed logical pages in the buffer. For instance, referring to FIG. 1, the controller 123 may create a new container object in L2P mapping table 120, 205, 602 in volatile memory 118 (e.g., DRAM) mapping the logical address or logical page associated with the command to a physical address in the volatile memory 118 where the host data is currently buffered (e.g., the DRAM address). Afterwards, the controller may write (e.g., flush) the host data to the NVM 110, 201. For instance, the controller 123 may write to the superblock 704, 1000 associated with the active zone 502, in a fixed order such as described with respect to FIG. 10, the data stored in buffer pool 1104 of volatile memory 118, 1102 beginning at the start commit offset pointer 1108 and ending at the buffer index 1106 where the data was stored before the commit operation command was received. Moreover, as previously described with respect to block 914, the controller may release the previously created container object associated with that command in the L2P mapping table 120, 205, 602 and update the L2P mapping table with the physical address 208 in the NVM 110, 201 where the host data is written.

Thus, rather than writing data directly from the SRAM to the NVM 110, 201 as for sequential zones, for ZRWA zones the controller may copy data from the SRAM to the DRAM/DDR buffer where the data may be overwritten and maintained before being committed and written ultimately to the NVM. When writing ZRWA zone data to the NVM and updating L2P mapping table container objects, the process is similar to that described above for sequential zone data. For instance, the controller may write data 119, 202 from the buffer pool 1104 in volatile memory 118, 1102 to the superblock 704, 1000 in a fixed logical page order such as described with respect to FIG. 10, and the controller may replace the previous container object associated with that data in the L2P mapping table 120, 205, 602 with an L2P entry mapping the associated logical address to the physical address in the NVM memory location 112 where the data is stored. Moreover, the controller may write the data to the NVM 110, 201 in response to determining from stored container objects that a FSP of committed data is available in the buffer in volatile memory 118 to be written to the NVM 110, 201.

When creating, releasing, or updating a container object in the L2P mapping table 120, 205, 602 for an active zone (e.g., as described with respect to block 904 or block 920) or when updating the L2P mapping table with an L2P entry mapping the logical page to the NVM 110, 201 (e.g., as described with respect to block 914), the controller may determine the zone identifier (ID) and calculate the logical page offset inside the active zone from the logical address or LPI indicated in the host command, and the controller may perform the mapping update at the calculated logical page offset in the associated region 604 of the L2P mapping table. For example, the controller may calculate the zone ID of the zone 302, 402 associated with the host command (e.g., by dividing the LPI by the total number of zones, or applying the function: zone id=x/num_zones, where x is the LPI), determine the active zone ID from the zone ID (e.g., by comparing the zone ID to the list of active zones 502 and determining its index in the list as the active zone ID), and calculate the logical page offset within the zone 302, 402 associated with the host command (e.g., by performing a modulo operation to obtain a remainder after dividing the LPI by the number of LPIs per zone, or the function: logical page offset within zone=x % num_lpi_per_zone). Afterwards, the controller may access the region 604 associated with the command in the L2P mapping table using the active zone ID, the controller may access the particular L2P entry associated with the command in the region 604 using the logical page offset, and the controller may update that L2P entry with the corresponding physical address where the data is stored (e.g., in volatile memory 117 or the NVM 110, 201).

Similarly, when the controller 123 receives a zone read command from the host 104 for an active zone, the controller may directly access the L2P entry associated with the command in the associated region 604 of the L2P mapping table 120, 205, 602 using the LPI indicated in the command, the active zone index, and the logical page offset relative to the active zone for the given LPI. For instance, the controller may apply the following process to obtain the physical address associated with the data requested to be read in the command: (1) determine the absolute zone number from the LPI indicated in the command (e.g., using the following function: absolute zone number=LPI/number of logical pages in zone), (2) determine whether the zone is active (e.g., in the list of active zones 502) and identify the active zone index (or active zone number) associated with the absolute zone number, (3) determine the logical page offset (the LPI number) relative to the active zone for the given LPI; (4) and obtain the physical address associated with the command from the L2P mapping table associated with the relative LPI number (the logical page offset) in the region of the table associated with the active zone index. After obtaining the physical address, the controller 123 may read the data from the superblock 1000 in the NVM 110, 201 at the obtained physical address.

As an example, if the controller 123 determines that the LPI or LBA indicated in the zone read command is LBA '1600', and that the number of logical pages in a zone is '5', the controller may derive that LBA '1600' is in zone '320' (1600/5) with offset/relative LPI '0' (1600%5). The controller may then check whether zone '320' is in its active zone list. For example, if the list of active zones 502 is '100', '320', '700', then the controller may determine zone '320' is active and is associated with active zone index '1'. Using this active zone index '1' and the relative LPI number with respect to the zone (offset '0'), the controller may locate the region 604 for active zone index '1' and determine the L2P entry corresponding to offset '0' in the L2P mapping table 120, 205, 602. For example, if the L2P mapping table stores L2P entries '0' through '4' in region '0' (corresponding to LPI offsets '0' through '4' for active zone index '0'), and L2P entries '5' through '9' in region '1' (corresponding to LPI offsets '0' through '4' for active zone index '1'), the controller may determine the applicable L2P entry for LBA 1600 to be at index 5 in region '1'. From this L2P entry (e.g., entry 206) for LBA 1600, the controller may identify the associated physical address in the NVM 110, 201 and read the data from the identified physical address accordingly.

On the other hand, when the controller 123 receives a zone read command from the host 104 for an inactive zone, the L2P mapping table 120, 205, 602 does not store any L2P entries for this zone. Instead, the controller may access the superblock mapping table 702 and determine the associated physical address for the command using the LPI number indicated in the command and the superblock number indicated in the superblock mapping table 702. For instance, the controller may apply the following process to obtain the physical address: (1) determine the zone number from the LPI indicated in the command (e.g., using the following function: zone number=LPI/number of logical pages in zone), (2) identify the superblock number or index mapped to the zone number in the superblock mapping table 702, and (3) derive the physical address associated with the command in the identified superblock.

To derive the physical address at (3), the controller may further apply the following sub-process: (a) calculate the relative logical page number within the zone (e.g., using the following function: logical page offset=LPI % number of logical pages in zone), (b) calculate the physical page number in the superblock 704, 1000 associated with the command (e.g., the value of Z in FIG. 10) using the following function: relative logical page number within zone (the logical page offset)/number of logical pages in a physical page of the superblock (the value of N*K in FIG. 10), (c) determine the die index in the superblock associated with the command (e.g., the value of N in FIG. 10) using the following function: relative logical page number within zone (the logical page offset)/number of logical pages in a physical page within a die of the superblock (the value of K in FIG. 10), and (d) determine the index of the logical page associated with the superblock using the following function: relative logical page number within zone (the logical page offset) % number of logical pages in a physical page within a die of the superblock.

Thus, the controller may determine the exact location of the logical page associated with the command in the superblock 704, 1000 (due to the logical page having been written according to the fixed order such as described with respect to FIG. 10), and the controller 123 may read the data in that logical page from the superblock 1000 in the NVM 110, 201 accordingly. As an example, if the controller 123 determines that the LPI or LBA indicated in the zone read command is LBA '1600', and that the number of logical pages in a zone is '5', the controller may derive that LBA '1600' is in zone '320' (1600/5) with offset/relative LPI '0' (1600%5). The controller may then check whether zone '320' is in its active zone list, and subsequently determine that zone '320' is an inactive zone (it is not in the active zone list). As a result, the controller may check zone '320' against the superblock mapping table 702, and if superblock '2' is mapped to zone '320', the controller may determine that the associated superblock with the command is superblock '2'. The controller may then derive the physical page including the logical page offset associated with the command in superblock '2'. For example, if the number N of dies is '4' and the number K of logical pages in a superblock physical page is '24' (covering 96 kB of data per physical page), then based on the previously determined logical page offset of '0', the controller may determine the physical page number to be '0' (0/(4*24)), the die index to be '0' (0/24), and the logical page index within the physical page to be '0' (0% (4*24)). Thus, using the aforementioned derived parameters, the controller may identify the exact physical location of the data associated with logical page offset '0' in the superblock (which logical page offset in superblock '2' corresponds to LBA '1600' in zone '320'), and the controller may read the data from that address accordingly without incurring the additional time required to fetch an L2P translation from the L2P mapping table.

Thus, in the above-described examples, the controller may access the L2P mapping table 120, 205, 602 to create or update L2P entries and derive physical addresses associated with active zones, while the controller may access the superblock mapping table 702 to create mappings and derive physical addresses associated with inactive zones. The controller may utilize this hybrid L2P mapping approach for active and inactive zones as a result of the manner in which the controller processes the zone operation management commands of FIGS. 8A-8C as previously described. For instance, the hybrid L2P mapping approach may occur in response to the controller creating L2P entries for active zones in response to zone open or write commands, clearing L2P entries for active zones and creating superblock mappings for inactive zones in response to zone finish commands, and clearing superblock mappings for inactive zones in response to zone reset commands). However, in alternative examples, the use of a zone-to-superblock mapping to derive the physical address associated with a command rather than the L2P mapping table may not necessarily be limited to inactive zones. For example, if the controller also maintains zone-to-superblock mappings for active zones in another memory location than in the superblock mapping table 702, then the controller may utilize such mappings and consequently bypass the L2P mapping table to identify physical addresses associated with commands even for active zones.

Figure 12A:
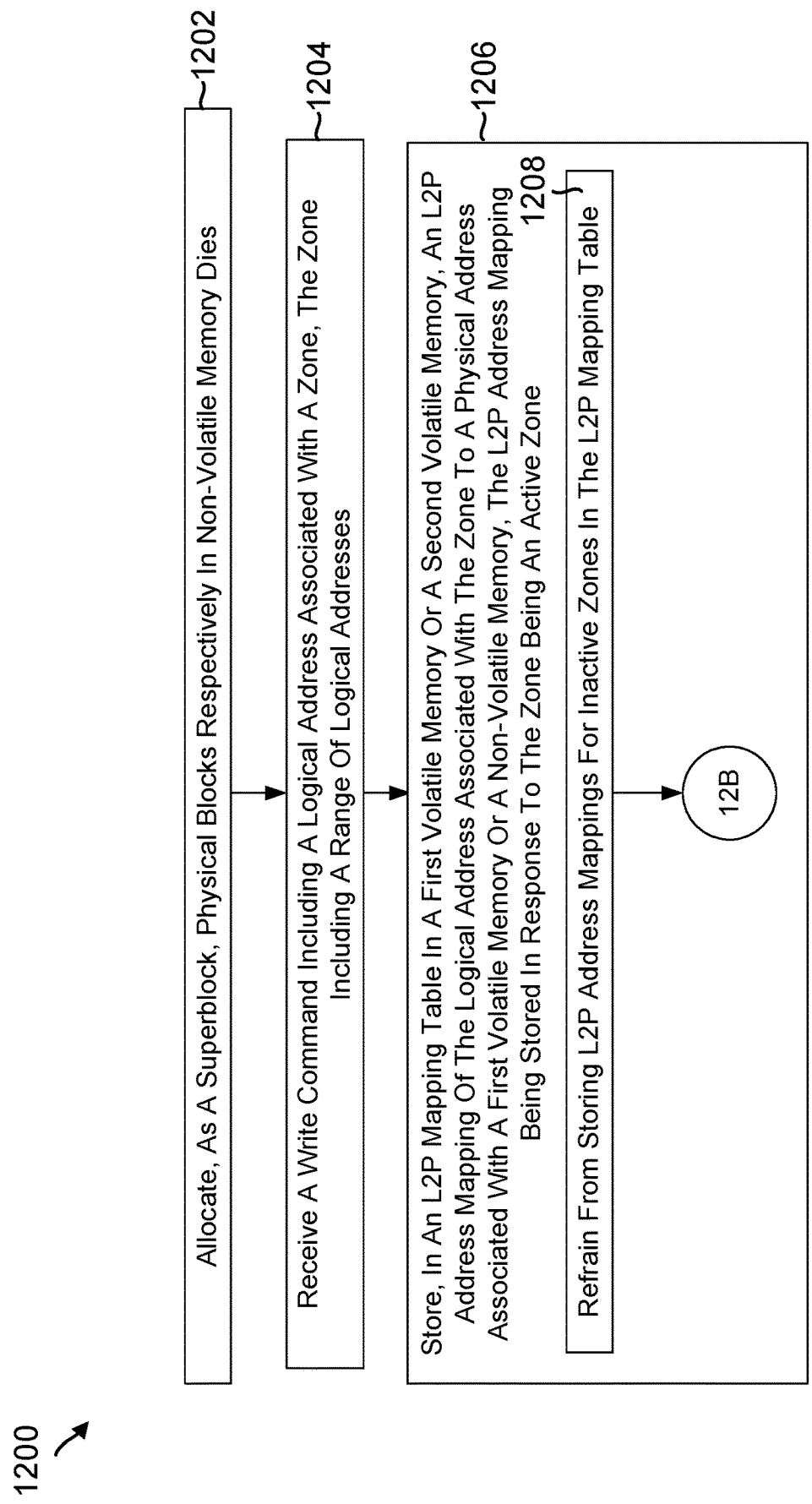
FIGS. 12A-12C are flow charts illustrating an example of a method for handling host write commands associated with active and inactive zones using a hybrid L2P mapping approach, as performed by the storage device of FIG. 1.
Figure 12B:
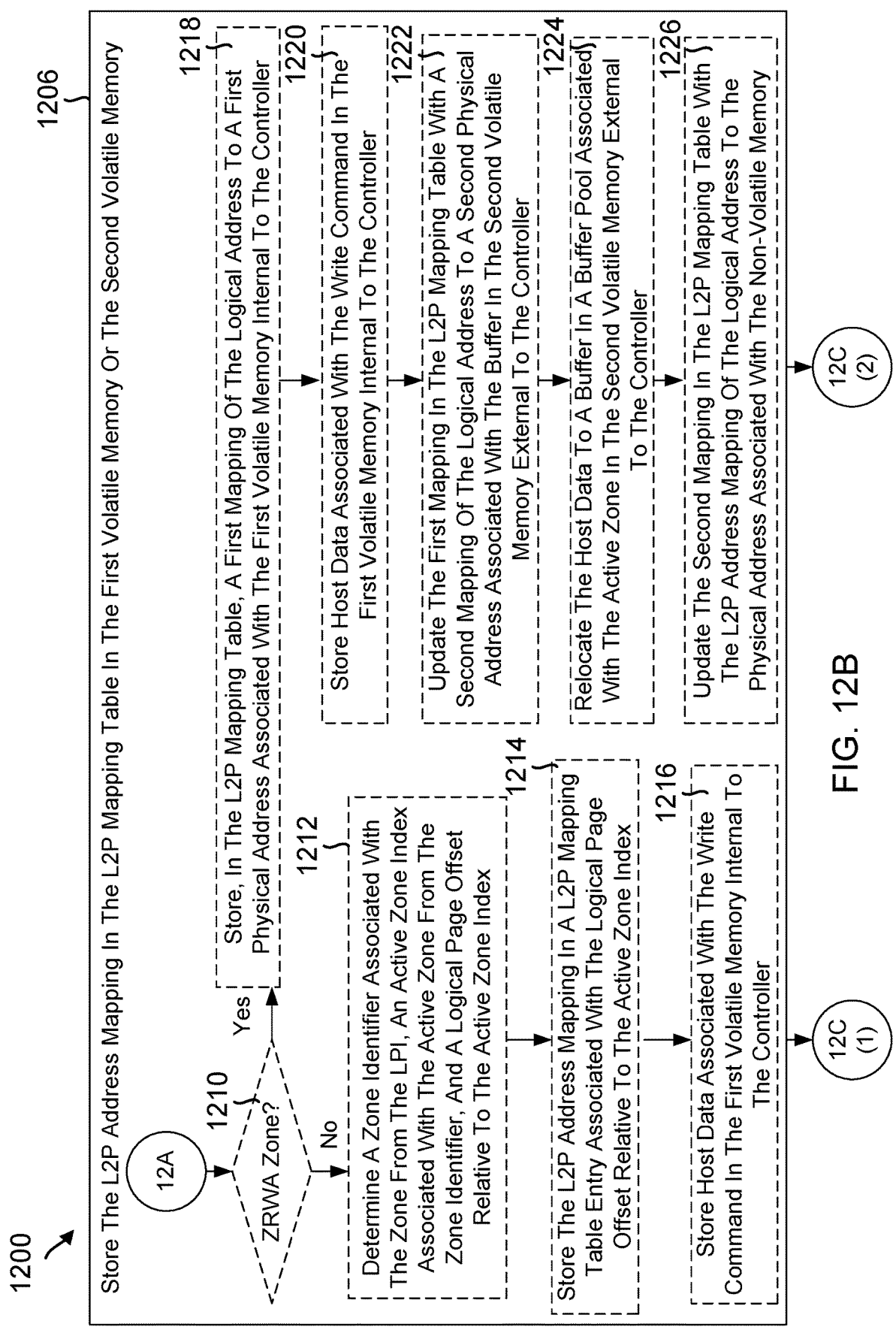
Figure 12C:
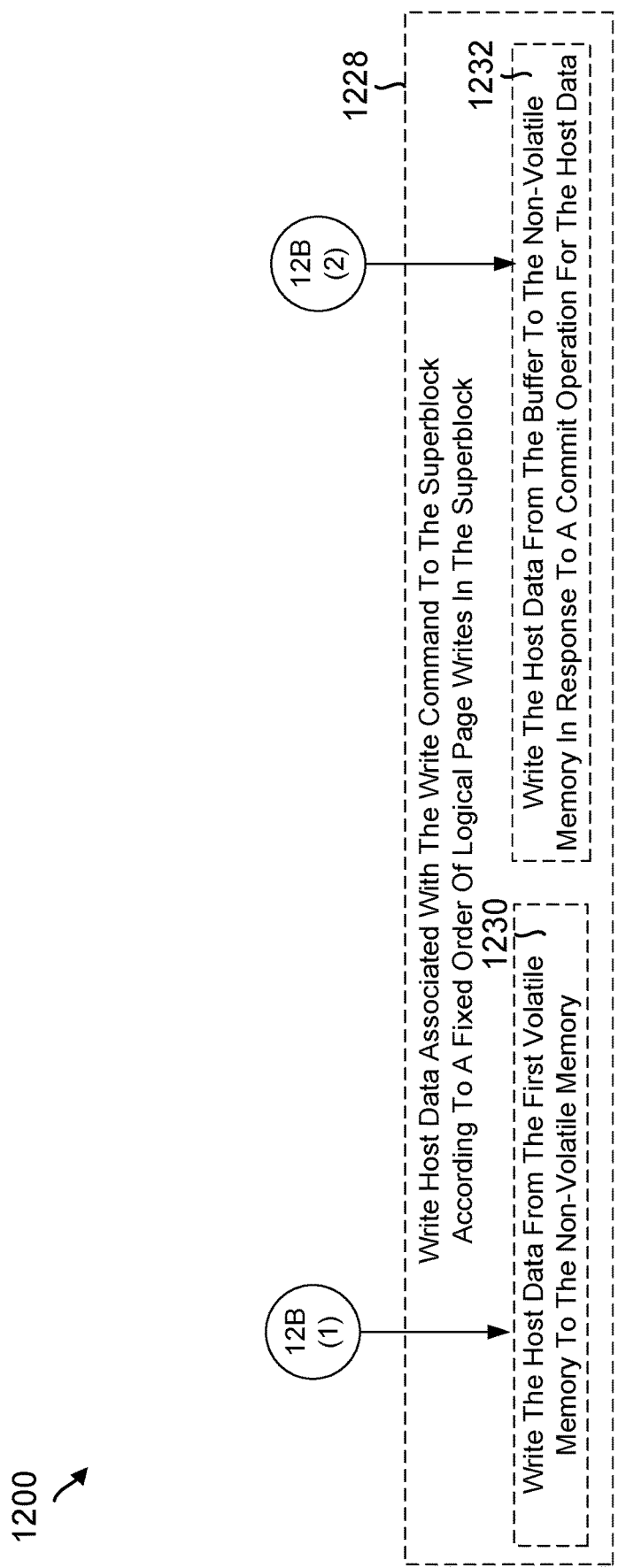

FIGS. 12A-12C illustrate an example flow chart 1200 of a method for handling host commands associated with active and inactive zones using a hybrid L2P mapping system. For example, the method can be carried out in a storage device 102 such as the one illustrated in FIG. 1. Each of the steps in the flow chart can be controlled using the controller as described below (e.g. controller 123), by a component or module of the controller, or by some other suitable means.

Referring to FIG. 12A, as represented by block 1202, the storage device (e.g., storage device 102) may include a non-volatile memory (e.g., NVM 110, 201) including a plurality of physical blocks (e.g., physical blocks 1002) respectively in a plurality of non-volatile memory dies (e.g., dies 114, memory dies 1004), and the controller may allocate, as a superblock (e.g., superblock 704, 1000), one or more of the physical blocks. For example, referring to FIG. 10, the controller 123 may group, designate, or otherwise allocate physical blocks 1002 across memory dies 1004 into superblock 1000, which may be an active zone resource allocated, e.g., at block 804 of FIG. 8A.

As represented by block 1204, the controller may receive a write command (e.g., at block 902, such as a zone write command at block 802) including a logical address (e.g., logical address 304 such an LBA) associated with a zone (e.g., zone 302, 402), the zone including a range of logical addresses (e.g., logical addresses 304). For example, the logical address may be a LPI. Moreover, the superblock allocated at block 1202 may be associated with the zone. For example, when mapping logical addresses to physical addresses in an L2P mapping table and storing host data in the non-volatile memory, the controller may associate the logical addresses within the zone to the physical addresses in a single superblock, and the controller may write host data associated with those logical addresses to those same physical addresses in the single superblock.

As represented by block 1206, the storage device may include a first volatile memory (e.g., volatile memory 117 such as SRAM) and a second volatile memory (e.g., volatile memory 118 such as DRAM or DDR SDRAM), and the controller may store, in an L2P mapping table in the first volatile memory or the second volatile memory (e.g., L2P mapping table 120, 205, 602 in SRAM or DRAM), an L2P address mapping (e.g., entry 206) of the logical address associated with the zone to a physical address (e.g., physical address 208) associated with the first volatile memory (e.g., an SRAM address such as at block 904) or the non-volatile memory (e.g., a NVM physical address such as a PBA at block 806, 914). The controller may store the L2P address mapping in response to determining that the zone is an active zone (e.g., is in the list of active zones 502). Thus, as represented by block 1208, the controller may refrain from storing L2P address mappings for inactive zones in the L2P mapping table. In one example, the L2P mapping table may include a plurality of logical regions (e.g., regions 604) including a range of logical page offsets (e.g., relative LPIs in respective entries 206), each of the logical regions being associated with a respective active zone (e.g., as illustrated in FIG. 6).

Referring to FIG. 12B, to store the L2P address mapping of the LPI associated with the active zone at block 1206, as represented by block 1210, the controller may initially determine whether the active zone is a ZRWA zone or a sequential zone (e.g., at block 910). If the active zone is a sequential zone (an active sequential zone), then as represented by block 1212, the controller may determine a zone identifier associated with the zone from the LPI included in the write command, an active zone index associated with the zone from the zone identifier, and a logical page offset relative to the active zone index. For instance, the controller may determine the zone identifier (ID) and calculate the logical page offset inside the active zone from the logical address or LPI indicated in the host command, and the controller may perform the mapping update at the calculated logical page offset in the associated region 604 of the L2P mapping table. For example, the controller may calculate the zone ID of the zone 302, 402 associated with the host command (e.g., by dividing the LPI by the total number of zones, or applying the function: zone id=x/num_zones, where x is the LPI), determine the active zone ID from the zone ID (e.g., by comparing the zone ID to the list of active zones 502 and determining its index in the list as the active zone ID), and calculate the logical page offset within the zone 302, 402 associated with the host command (e.g., by performing a modulo operation to obtain a remainder after dividing the LPI by the number of LPIs per zone, or the function: logical page offset within zone=x % num_lpi_per_zone). Moreover, as represented by block 1214, the controller may store the L2P address mapping in an L2P mapping table entry associated with the logical page offset relative to the active zone index (e.g., at block 904 using the aforementioned calculated parameters to access the region 604 and associated L2P entry in the L2P mapping table 602), and as represented by block 1216, the controller may store host data associated with the write command in the first volatile memory (e.g., volatile memory 117 at block 906).

Alternatively, if the controller determines at block 1210 that the active zone is a ZRWA zone (e.g., the controller determines at block 910 that the active zone 502 is associated with a ZRWA 404), then as represented by block 1218, the controller may store, in the L2P mapping table, a first mapping of the logical address to a first physical address associated with the first volatile memory (e.g., at block 904 using an SRAM address). Moreover, as represented by block 1220, the controller may store host data associated with the write command in the first volatile memory (e.g., in volatile memory 117 at block 906). Afterwards, as represented by block 1222, the controller may update the first mapping in the L2P mapping table with a second mapping of the logical address to a second physical address associated with a buffer in the second volatile memory (e.g., at block 916 using a DRAM address for a buffer associated with buffer index 1106 in buffer pool 1104). Furthermore, as represented by block 1224, the controller may relocate the host data to the buffer in a buffer pool associated with the active zone in the second volatile memory (e.g., volatile memory 118 at block 916 to the aforementioned buffer in the buffer pool 1104 associated with the active zone 502 being written). The controller may also, as represented by block 1226, update the second mapping in the L2P mapping table with the L2P address mapping of the logical address to the physical address associated with the non-volatile memory (e.g., at block 804, 920 using a PBA).

In one example, a size of the buffer pool associated with the active zone and referenced at block 1224 and is a same size as a ZRWA window size associated with the active zone (e.g., the size of the buffer pool 1104 is the same as the size of ZRWA window 406 of the ZRWA 404 associated with the active zone 502).

Now referring to FIG. 12C, as represented by block 1228, the controller may write host data associated with the write command to the superblock allocated at block 1202 according to a fixed order of logical page writes in the superblock (e.g., as described above with respect to FIG. 10). If the zone was determined at block 1210 in FIG. 12B to be a sequential zone, then as represented by block 1230, the controller may write the host data stored at block 1216 from the first volatile memory to the superblock in the non-volatile memory (e.g., at block 912 from SRAM to the superblock 704, 1000 in the NVM 110, 201). If the zone was alternatively determined at block 1210 in FIG. 12B to be a ZRWA zone, then as represented by block 1232, the controller may write the host data relocated to the buffer at block 1224 from the buffer to the superblock in the non-volatile memory (e.g., at block 920 from buffer pool 1104 in DRAM to the superblock 704, 1000 in the NVM 110, 201) in response to a commit operation for the host data (e.g., explicit commit command 408 or implicit commit command 410).

In one example, the buffer referenced at block 1224 (e.g., buffer pool 1104) is associated with a buffer index (e.g., buffer index 1106) that is a function of a start commit offset for the commit operation referenced at block 1232 (e.g., start commit offset pointer 1108), the logical address associated with the write command received at block 1204, and a previously committed logical address. For example, for a respective logical page of data received from host 104, the controller may determine the next available buffer index in the active zone 502 (into which to copy the host data from the SRAM) as a function of the current LPI associated with that host data, the last committed LPI, the start commit offset pointer 1108, and the number of buffers in the buffer pool 1104 (e.g., the 1 MB buffer region). More particularly, this function may be the remainder of the sum of the difference between the current LPI and the last committed LPI and the start commit offset after dividing this sum by the number of buffers in the buffer pool 1104, as follows: DDR buffer index in a zone=((Curr LPI-last committed LPI)+start_commit_offset) % (buffers_in_1 MB_region).

Figure 13:
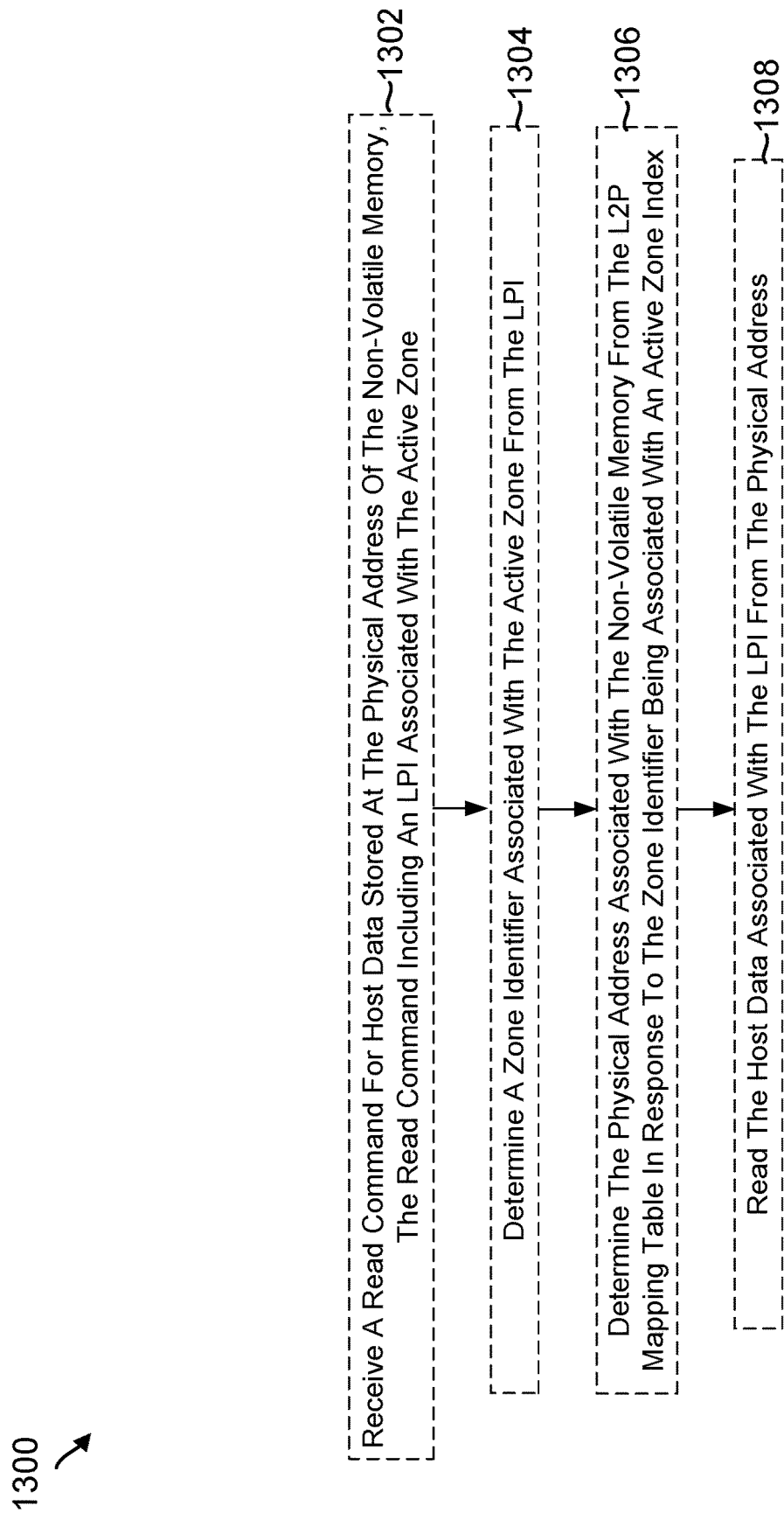
FIG. 13 is a flowchart illustrating an example of a method for handling host read commands associated with active zones using a hybrid L2P mapping approach, as performed by the storage device of FIG. 1.

FIG. 13 is a flowchart illustrating an example of a method for handling host read commands associated with active zones using a hybrid L2P mapping approach, as performed by the storage device of FIG. 1. For example, the method can be carried out in a storage device 102 such as the one illustrated in FIG. 1. Each of the steps in the flow chart can be controlled using the controller as described below (e.g. controller 123), by a component or module of the controller, or by some other suitable means.

Referring now to FIG. 13, after writing the host data at block 1228 to the superblock associated with the zone and while the zone is still an active zone, as represented by block 1302, the controller may receive a read command for the host data stored at the physical address of the non-volatile memory. The read command may include an LPI associated with an active zone. In response to the read command, as represented by block 1304, the controller may determine a zone identifier associated with the active zone from the LPI, and then as represented by block 1306, the controller may determine the physical address associated with the non-volatile memory from the L2P mapping table in response to the zone identifier being associated with an active zone index. Following determination of the physical address, as represented by block 1308, the controller may read the host data associated with the LPI from the determined physical address.

As an example of blocks 1302, 1304, 1306, and 1308, when the controller 123 receives a zone read command from the host 104 for an active zone, the controller may directly access the L2P entry associated with the command in the associated region 604 of the L2P mapping table 120, 205, 602 using the LPI indicated in the command, the active zone index, and the logical page offset relative to the active zone for the given LPI. For instance, the controller may apply the following process to obtain the physical address associated with the data requested to be read in the command: (1) determine the absolute zone number from the LPI indicated in the command (e.g., using the following function: absolute zone number=LPI/number of logical pages in zone), (2) determine whether the zone is active (e.g., in the list of active zones 502) and identify the active zone index (or active zone number) associated with the absolute zone number, (3) determine the logical page offset (the LPI number) relative to the active zone for the given LPI; (4) and obtain the physical address associated with the command from the L2P mapping table associated with the relative LPI number (the logical page offset) in the region of the table associated with the active zone index. After obtaining the physical address, the controller 123 may read the data from the superblock 1000 in the NVM 110, 201 at the obtained physical address.

Figure 14:
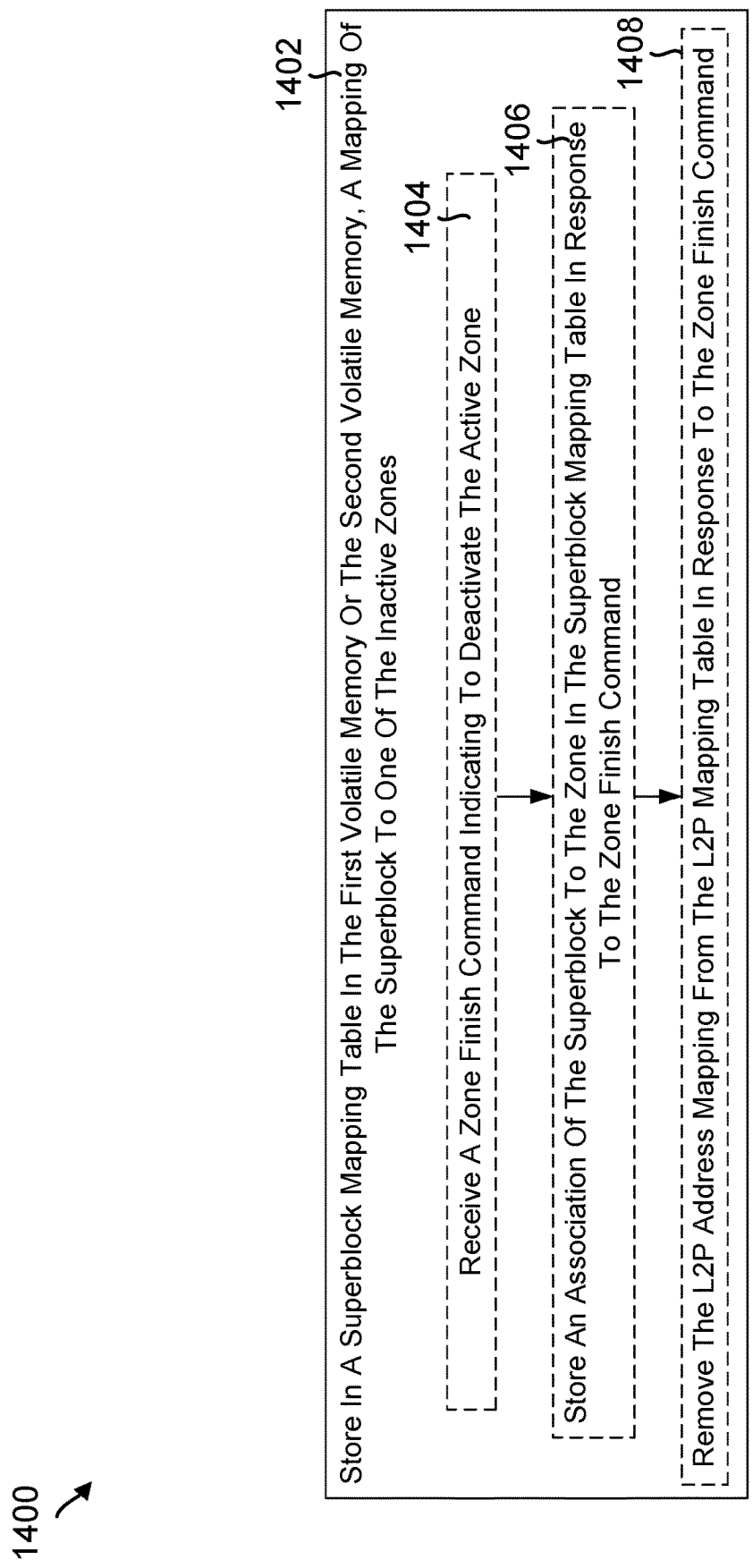
FIG. 14 a flowchart illustrating an example of a method for handling host commands associated with inactive zones using a hybrid L2P mapping approach, as performed by the storage device of FIG. 1.

FIG. 14 a flowchart illustrating an example of a method for handling host commands associated with inactive zones using a hybrid L2P mapping approach, as performed by the storage device of FIG. 1. For example, the method can be carried out in a storage device 102 such as the one illustrated in FIG. 1. Each of the steps in the flow chart can be controlled using the controller as described below (e.g. controller 123), by a component or module of the controller, or by some other suitable means.

Referring now to FIG. 14, as represented by block 1402, the controller may store in a superblock mapping table (e.g., superblock mapping table 702) in the first volatile memory (e.g., volatile memory 117) or the second volatile memory (e.g., volatile memory 118), a mapping of the superblock to one of the inactive zones (e.g., at block 824). For instance, as represented by block 1404, the controller may receive a zone finish command (e.g., at block 822) indicating to deactivate the aforementioned, active zone, and as represented by block 1406, the controller may store an association of the superblock to this deactivated, inactive, zone in the superblock mapping table in response to the zone finish command (e.g., at block 824). The controller may also, as represented by block 1408, remove the L2P address mapping previously stored at block 1206 from the L2P mapping table in response to the zone finish command (e.g., at block 826). Alternatively, the inactive zone referenced at block 1402 may be different than the active zone referenced above.

Figure 15:
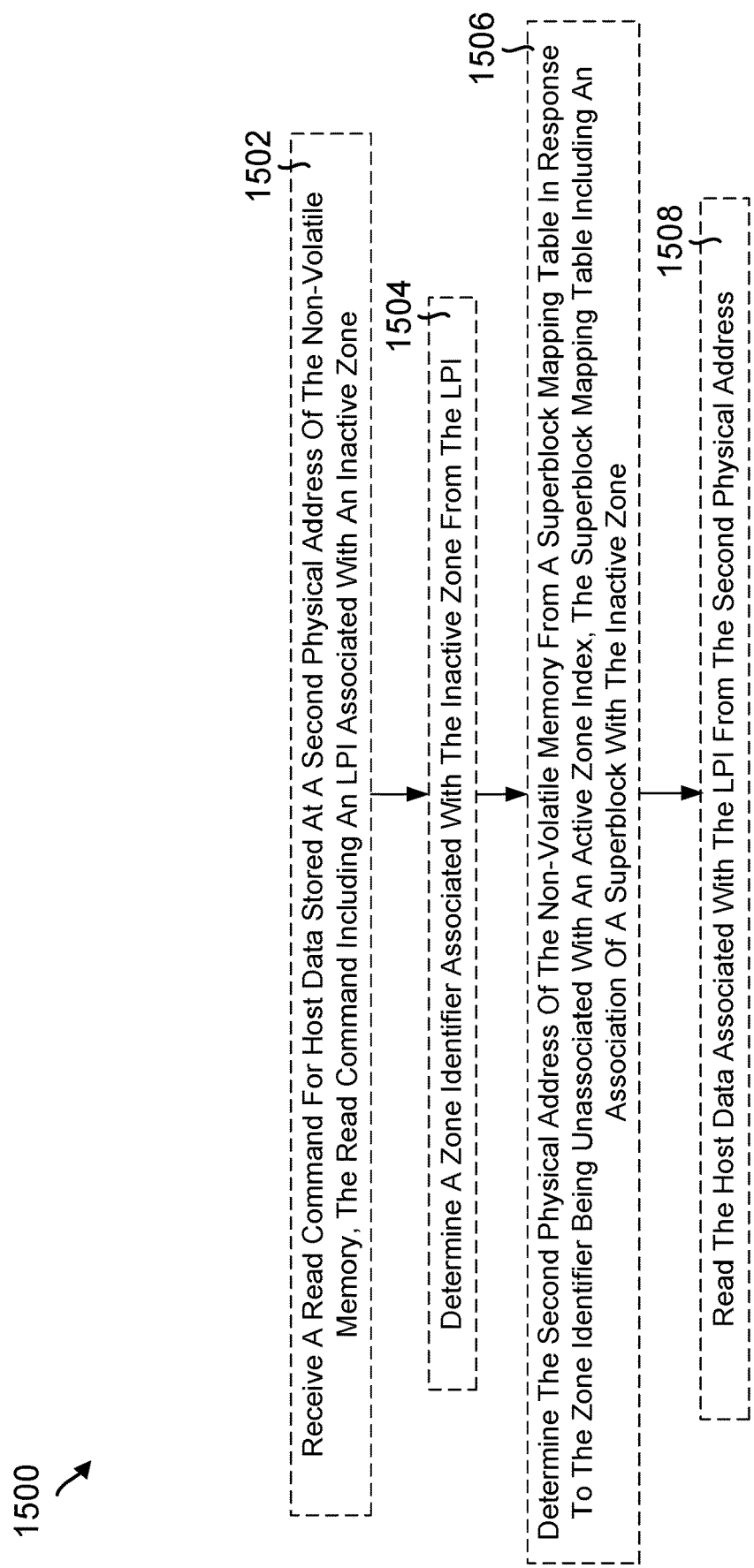
FIG. 15 is a flowchart illustrating an example of a method for handling host read commands associated with inactive zones using a hybrid L2P mapping approach, as performed by the storage device of FIG. 1.

FIG. 15 is a flowchart illustrating an example of a method for handling host read commands associated with inactive zones using a hybrid L2P mapping approach, as performed by the storage device of FIG. 1. For example, the method can be carried out in a storage device 102 such as the one illustrated in FIG. 1. Each of the steps in the flow chart can be controlled using the controller as described below (e.g. controller 123), by a component or module of the controller, or by some other suitable means.

Referring now to FIG. 15, after storing the mapping of the superblock to the inactive zone at block 1402, as represented by block 1502, the controller may receive a read command for host data stored at a second physical address of the non-volatile memory. The read command may include an LPI associated with the inactive zone. The second physical address may be either the same physical address as that previously referenced at block 1302 (if the inactive zone is the same zone as the previously referenced active zone) or a different physical address (if the inactive zone is a different zone than the previously referenced active zone). For example, in one scenario, the read operations of FIG. 13 may be performed for an active zone at a first physical address before, after, or while the read operations of FIG. 15 are performed for a different, inactive zone at a second, different physical address. Alternatively, in another scenario, the read operations of FIG. 13 may be performed for an active zone at a first physical address, the active zone may become inactive in response to a zone finish, and the read operations of FIG. 15 may be subsequently performed for that same inactive zone at that same physical address (referenced in this scenario as the second physical address). In response to the read command, as represented by block 1504, the controller may determine a zone identifier associated with the inactive zone from the LPI, and as represented by block 1506, the controller may determine the second physical address of the non-volatile memory from the superblock mapping table in response to the zone identifier being unassociated with an active zone index. Following determination of the second physical address, as represented by block 1508, the controller may read the host data associated with the LPI from the second physical address.

As an example of blocks 1502, 1504, 1506, and 1508, when the controller 123 receives a zone read command from the host 104 for an inactive zone, the controller may access the superblock mapping table 702 and determine the associated physical address for the command using the LPI number indicated in the command and the superblock number indicated in the superblock mapping table 702. For instance, the controller may apply the following process to obtain the physical address: (1) determine the zone number from the LPI indicated in the command (e.g., using the following function: zone number=LPI/number of logical pages in zone), (2) identify the superblock number or index mapped to the zone number in the superblock mapping table 702, and (3) derive the physical address associated with the command in the identified superblock. Moreover, to derive the physical address at (3), the controller may further apply the following sub-process: (a) calculate the relative logical page number within the zone (e.g., using the following function: logical page offset=LPI % number of logical pages in zone), (b) calculate the physical page number in the superblock 704, 1000 associated with the command (e.g., the value of Z in FIG. 10) using the following function: relative logical page number within zone (the logical page offset)/number of logical pages in a physical page of the superblock (the value of N*K in FIG. 10), (c) determine the die index in the superblock associated with the command (e.g., the value of N in FIG. 10) using the following function: relative logical page number within zone (the logical page offset)/number of logical pages in a physical page within a die of the superblock (the value of K in FIG. 10), and (d) determine the index of the logical page associated with the superblock using the following function: relative logical page number within zone (the logical page offset) % number of logical pages in a physical page within a die of the superblock. After obtaining the physical address, the controller 123 may read the data from the superblock 1000 in the NVM 110, 201 at the obtained physical address.

Figure 16:
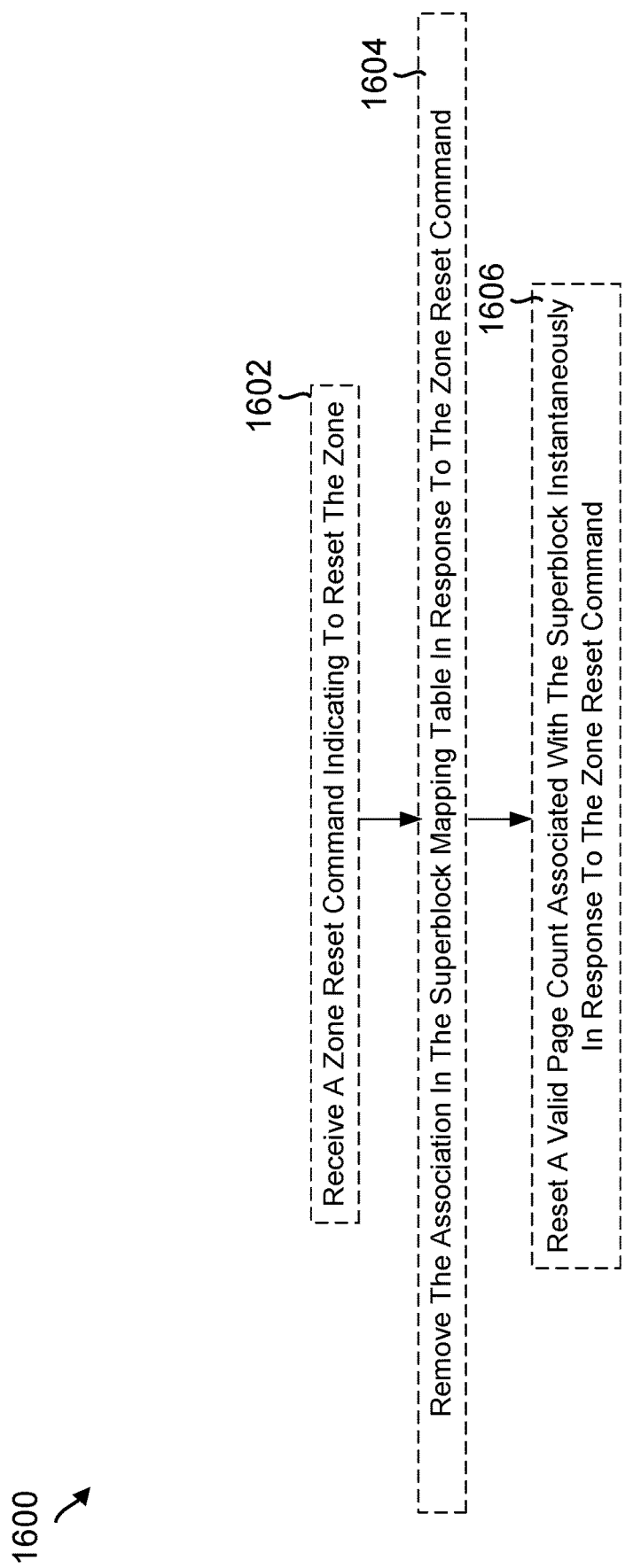
FIG. 16 is a flowchart illustrating an example of a method for handling zone reset commands associated with inactive zones using a hybrid L2P mapping approach, as performed by the storage device of FIG. 1.

FIG. 16 is a flowchart illustrating an example of a method for handling zone reset commands associated with inactive zones using a hybrid L2P mapping approach, as performed by the storage device of FIG. 1. For example, the method can be carried out in a storage device 102 such as the one illustrated in FIG. 1. Each of the steps in the flow chart can be controlled using the controller as described below (e.g. controller 123), by a component or module of the controller, or by some other suitable means.

Referring to FIG. 16, as represented by block 1602, the controller may receive a zone reset command indicating to reset the aforementioned inactive zone (e.g., at block 842). As a result, as represented by block 1604, the controller may remove the association stored at block 1406 in the superblock mapping table in response to the zone reset command (e.g., at block 844). Moreover, as represented by block 1606, the controller may reset a valid page count associated with the superblock instantaneously in response to the zone reset command (e.g., at block 846).

Figure 17:
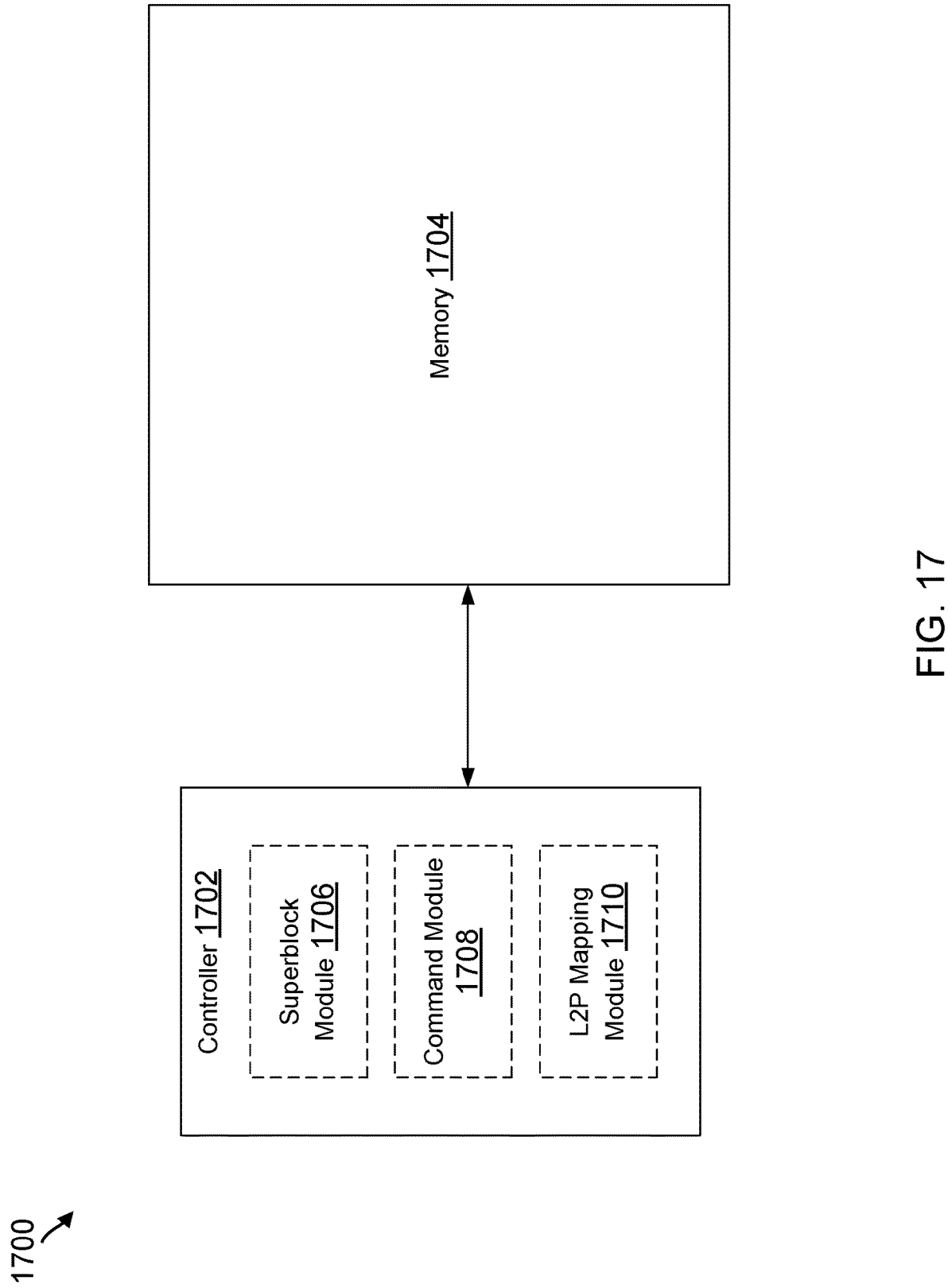
FIG. 17 is a conceptual diagram illustrating an example of a controller that handles host commands associated with active and inactive zones using a hybrid L2P mapping approach in the storage device of FIG. 1.

FIG. 17 is a conceptual diagram illustrating an example 1700 of a controller 1702 coupled to a memory 1704 in a storage device. For example, controller 1702 may correspond to controller 123 and memory 1704 may correspond to the NVM 110, 201 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1702 includes a superblock module 1706 that may provide a means for allocating, as a superblock, one or more of the physical blocks respectively in one or more of the non-volatile memory dies, and a means for storing in a superblock mapping table in the first volatile memory or the second volatile memory, a mapping of the superblock to the zone in response to a zone finish command indicating to deactivate the active zone into an inactive zone. For example, the superblock module 1706 may perform the process described above with respect to block 1202 of FIG. 12A and block 1402 of FIG. 14.

In one example, the controller 1702 includes a command module 1708 that may provide a means for receiving a write command including a logical address associated with a zone, the zone including a range of logical addresses. For example, the command module 1708 may perform the process described above with respect to block 1204 of FIG. 12A.

In one example, the controller 1702 includes a L2P mapping module 1710 that may provide a means for storing, in a L2P mapping table in the first volatile memory or the second volatile memory, a L2P address mapping of the logical address associated with the zone to a physical address associated with the first volatile memory or the superblock, the L2P address mapping being stored in response to the zone being an active zone; a means for refraining from storing L2P address mappings for inactive zones in the L2P mapping table, and a means for removing the L2P address mapping from the L2P mapping table further in response to the zone finish command. For example, the L2P mapping module 1710 may perform the process described above with respect to block 1206 of FIGS. 12A and 12B, block 1208 of FIG. 12A, and block 1408 of FIG. 14.

Accordingly, as a result of employing this hybrid L2P mapping approach to handle host commands associated with active and inactive zones, storage device costs may be reduced and performance increased. For example, since the controller 123 in the storage device 102 may not store all the L2P entries for every zone in an L2P mapping table in DRAM (or other volatile memory) but only those L2P entries for active zones, the size of the L2P mapping table in the DRAM (or other volatile memory) may be significantly reduced (e.g., by approximately 99% such as from 2 GB to 20 MB). This reduction in DRAM size may result in the storage device having an easily scalable design, where the controller may apply this hybrid mapping approach without restriction on device memory capacity and with additional support for ZRWA.

Moreover, latency in performing zone read commands may be reduced (and performance thus improved) as a result of this hybrid mapping approach. For instance, the controller may directly access the superblock mapping table 702 for processing read commands in inactive zones in SRAM with significantly faster time than that which would be incurred from accessing the L2P mapping table in DRAM, and the L2P mapping table may be stored in SRAM rather than DRAM due to occupying significantly less memory as a result of the lack of L2P entries for inactive zones. Thus, slower DRAM access may be minimized or even avoided as a result of the superblock mapping table, which may result in a significant performance boost since most zone read commands are associated with inactive zones (e.g., since thousands of inactive zones may exist compared to for example 14 active zones). Additionally, the hybrid mapping approach may result in improved time to ready (TTR) performance of the storage device since rebuilding a L2P mapping table including only L2P entries for active zones (e.g., during initialization after an ungraceful shutdown) may be significantly faster than if the L2P mapping table also included L2P entries for inactive zones. Moreover, zone reset commands may be processed with lower latency and improved performance since the controller does not un-map the L2P entries for the zone (as these entries were previously removed in response to a zone finish command), nor gradually decrease the VPC associated with the zone as L2P entries are un-mapped for that zone (which gradual process may require frequent fetches of data from DRAM).

Furthermore, the reduction in size of the L2P mapping table may result in a reduced backup of the L2P mapping table from volatile to non-volatile memory, thus increasing the amount of overprovisioning (OP) available in the storage device and thereby reducing the write amplification factor (WAF). For example, the controller may periodically return or flushs the L2P mapping table to the NVM and generally allocate a large number of physical blocks specifically for writing this L2P mapping table. Here, with the significantly reduced L2P mapping table size as a result of removing L2P entries for inactive zones, the controller may allocate less blocks for the L2P mapping table and may instead utilize these blocks for host data by adding them to a pool of OP blocks. With this increase in available OP blocks, the WAF of the storage device may be reduced and performance increased.

Finally, the hybrid mapping approach may result in significant reduction in WAF for ZRWA. For example, when a controller writes data in a ZRWA in a typical SSD, that data may be eventually flushed to an open superblock associated with the zone, but if there are overwrite(s) of data in the ZRWA, the overwrite(s) may be stored in a non-volatile staging area for this purpose that includes data overwrites from multiple zones. Such mixing of data may increase the WAF if multiple overwrites to the same logical address occur in the zone, since the data is being overwritten numerous times in the superblock. Furthermore, even if data in the non-volatile staging area is recycled to a new superblock associated with the zone, such writing of data into a new superblock may further increase the WAF. However, in the storage device 102, since these overwrites are captured in DRAM or other volatile memory rather than directly flushed to the non-volatile staging area, the data may be updated multiple times in volatile memory before the final updated data is written following a commit operation to the open superblock associated with the zone. Recycling of overwritten data may also be reduced or avoided since overwritten data may not be segregated in the NVM from the other data in the first place. As a result, a nominal WAF (e.g., WAF=1) may be maintained, program/erase cycles may be saved, and storage device life may be increased.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a non-volatile memory;
   a first volatile memory and a second volatile memory; and
   a controller configured to:
      receive a write command including a logical address associated with a zone, the zone including a range of logical addresses;
      store, in a logical-to-physical (L2P) mapping table in the first volatile memory or the second volatile memory, a L2P address mapping of the logical address associated with the zone to a physical address associated with the first volatile memory or the non-volatile memory, the L2P address mapping being stored in response to the zone being an active zone; and
      refrain from storing L2P address mappings for inactive zones in the L2P mapping table such that L2P address mappings for sequential data including logical page indices (LPIs) are maintained in the L2P mapping table for only active zones.

2. The storage device of claim 1, wherein the L2P mapping table includes a plurality of logical regions including a range of logical page offsets, each of the logical regions being associated with a respective active zone.

3. The storage device of claim 2, wherein the logical address is a logical page index (LPI), and to store the L2P address mapping in the L2P mapping table, the controller is further configured to:
   determine a zone identifier associated with the zone from the LPI, an active zone index associated with the zone from the zone identifier, and a logical page offset relative to the active zone index; and
   store the L2P address mapping in an L2P mapping table entry associated with the logical page offset relative to the active zone index.

4. The storage device of claim 1, wherein the non-volatile memory comprises a plurality of physical blocks respectively in a plurality of non-volatile memory dies, and wherein the controller is further configured to:
   allocate, as a superblock, one or more of the physical blocks; and
   store in a superblock mapping table in the first volatile memory or the second volatile memory, a mapping of the superblock to one of the inactive zones.

5. The storage device of claim 4, wherein the controller is further configured to:
   receive a zone finish command indicating to deactivate the active zone; and
   store an association of the superblock to the zone in the superblock mapping table in response to the zone finish command.

6. The storage device of claim 5, wherein the controller is further configured to remove the L2P address mapping from the L2P mapping table in response to the zone finish command.

7. The storage device of claim 5, wherein the controller is further configured to:
   receive a zone reset command indicating to reset the zone;
   remove the association in the superblock mapping table in response to the zone reset command; and
   reset a valid page count associated with the superblock instantaneously in response to the zone reset command.

8. The storage device of claim 1,
   wherein the active zone is a sequential zone, and the controller is further configured to:
      store host data associated with the write command in the first volatile memory internal to the controller; and
      write the host data from the first volatile memory to the non-volatile memory.

9. The storage device of claim 1,
   wherein the zone is associated with a zone random write area (ZRWA), and the controller is further configured to:
      store host data associated with the write command in the first volatile memory internal to the controller;
      relocate the host data to a buffer in a buffer pool associated with the active zone in the second volatile memory external to the controller; and
      write the host data from the buffer to the non-volatile memory in response to a commit operation for the host data.

10. The storage device of claim 9, wherein a size of the buffer pool associated with the active zone is a same size as a ZRWA window size associated with the active zone.

11. The storage device of claim 9, wherein the buffer is associated with a buffer index that is a function of a start commit offset for the commit operation, the logical address associated with the write command, and a previously committed logical address.

12. The storage device of claim 9, wherein to store the L2P address mapping of the logical address associated with the zone to the physical address associated with the non-volatile memory, the controller is configured to:
store, in the L2P mapping table, a first mapping of the logical address to a first physical address associated with the first volatile memory internal to the controller;
update the first mapping in the L2P mapping table with a second mapping of the logical address to a second physical address associated with the buffer in the second volatile memory external to the controller; and
update the second mapping in the L2P mapping table with the L2P address mapping of the logical address to the physical address associated with the non-volatile memory.

13. The storage device of claim 1, wherein the non-volatile memory comprises a plurality of physical blocks respectively in a plurality of non-volatile memory dies, and wherein the controller is further configured to:
allocate, as a superblock, one or more of the physical blocks; and
write host data associated with the write command to the superblock according to a fixed order of logical page writes in the superblock.

14. The storage device of claim 1, wherein the controller is further configured to:
receive a read command for host data stored at the physical address of the non-volatile memory, the read command including a logical page index (LPI) associated with the active zone;
determine a zone identifier associated with the active zone from the LPI;
determine the physical address associated with the non-volatile memory from the L2P mapping table in response to the zone identifier being associated with an active zone index; and
read the host data associated with the LPI from the physical address.

15. The storage device of claim 1, the controller is further configured to:
receive a read command for host data stored at a second physical address of the non-volatile memory, the read command including a logical page index (LPI) associated with an inactive zone;
determine a zone identifier associated with the inactive zone from the LPI;
determine the second physical address of the non-volatile memory from a superblock mapping table in response to the zone identifier being unassociated with an active zone index, the superblock mapping table including an association of a superblock with the inactive zone; and
read the host data associated with the LPI from the second physical address.

16. A storage device, comprising:
a plurality of non-volatile memory dies, each of the non-volatile memory dies including a physical block;
a first volatile memory and a second volatile memory; and
a controller configured to:
allocate, as a superblock, one or more of the physical blocks;
store in a superblock mapping table in the first volatile memory or the second volatile memory, a mapping of the superblock to a zone, the zone including a range of logical addresses; and
refrain from storing logical-to-physical (L2P) address mappings for inactive zones in a L2P mapping table such that L2P address mappings for sequential data including logical page indices (LPIs) are maintained in the L2P mapping table for only active zones.

17. The storage device of claim 16, wherein the controller is further configured to:
receive a write command including a logical address in the range of logical addresses associated with the zone, the zone initially being an active sequential zone;
store host data associated with the write command in the first volatile memory internal to the controller;
write the host data from the first volatile memory to the superblock; and
receive a zone finish command indicating to deactivate the active sequential zone into an inactive zone, wherein the mapping of the superblock to the zone is stored in the superblock mapping table in response to the zone finish command.

18. The storage device of claim 16, wherein the controller is further configured to:
receive a write command including a logical address in the range of logical addresses associated with the zone, the zone initially being an active zone associated with a zone random write area (ZRWA);
store host data associated with the write command in the first volatile memory internal to the controller;
relocate the host data to a buffer in a buffer pool associated with the active zone in the second volatile memory external to the controller;
write the host data from the buffer to the superblock in response to a commit operation for the host data; and
receive a zone finish command indicating to deactivate the active zone into an inactive zone, wherein the mapping of the superblock to the zone is stored in the superblock mapping table in response to the zone finish command.

19. The storage device of claim 16, wherein the controller is further configured to:
receive a write command including a logical address in the range of logical addresses associated with the zone, the zone initially being an active zone;
write host data associated with the write command to the superblock;
store, in a logical-to-physical (L2P) mapping table in the first volatile memory or the second volatile memory, a L2P address mapping of the logical address associated with the zone to a physical address associated with the superblock, the L2P address mapping being stored in response to the zone being an active zone;
receive a zone finish command indicating to deactivate the active zone into an inactive zone, wherein the mapping of the superblock to the zone is stored in the superblock mapping table in response to the zone finish command; and
remove the L2P address mapping from the L2P mapping table further in response to the zone finish command.

20. A storage device, comprising:
a plurality of non-volatile memory dies, each of the non-volatile memory dies including a physical block;
a first volatile memory and a second volatile memory; and
a controller configured to:
allocate, as a superblock, one or more of the physical blocks;
receive a write command including a logical address associated with a zone, the zone including a range of logical addresses;
store, in a logical-to-physical (L2P) mapping table in the first volatile memory or the second volatile memory, a L2P address mapping of the logical address associated with the zone to a physical address associated with the first volatile memory or the superblock, the L2P address mapping being stored in response to the zone being an active zone;

refrain from storing L2P address mappings for inactive zones in the L2P mapping table such that L2P address mappings for sequential data including logical page indices (LPIs) are maintained in the L2P mapping table for only active zones;

store in a superblock mapping table in the first volatile memory or the second volatile memory, a mapping of the superblock to the zone in response to a zone finish command indicating to deactivate the active zone into an inactive zone; and remove the L2P address mapping from the L2P mapping table further in response to the zone finish command.

* * * * *